(12) United States Patent
Szeto

(10) Patent No.: US 10,455,375 B2
(45) Date of Patent: *Oct. 22, 2019

(54) CONTROLLING ACCESS TO A HARDWARE RESOURCE OF AN ELECTRONIC DEVICE BY A MAGNETICALLY ATTACHABLE ELECTRONIC DEVICE

(71) Applicant: Nanoport Technology Inc., Markham OT (CA)

(72) Inventor: Timothy Jing Yin Szeto, Mississauga (CA)

(73) Assignee: NANOPORT TECHNOLOGY INC., Markham (CA)

(*) Notice: Subject to any disclaimer, the term of this patent is extended or adjusted under 35 U.S.C. 154(b) by 154 days.

This patent is subject to a terminal disclaimer.

(21) Appl. No.: 15/356,647

(22) Filed: Nov. 20, 2016

(65) Prior Publication Data

US 2017/0149902 A1 May 25, 2017

Related U.S. Application Data

(60) Provisional application No. 62/258,463, filed on Nov. 21, 2015.

(51) Int. Cl.
*H04L 12/00* (2006.01)
*H04W 4/12* (2009.01)
(Continued)

(52) U.S. Cl.
CPC ............ *H04W 4/12* (2013.01); *H01F 7/0242* (2013.01); *H01R 13/6205* (2013.01);
(Continued)

(58) Field of Classification Search
CPC . H04L 67/125; H04L 67/306; H04L 67/1097; H04L 67/14; H04L 67/141; H04L 65/1069
(Continued)

(56) References Cited

U.S. PATENT DOCUMENTS 6,745,281 B1 * 6/2004 Saegusa ................ G06F 21/805
709/213
8,143,983 B1 * 3/2012 Lauder .................. G06F 1/1626
24/303

(Continued)

FOREIGN PATENT DOCUMENTS

WO 2015070321 5/2015

OTHER PUBLICATIONS

"Universal Magnetic Connector", URL: http://web.archive.org/web/20150905193509/http:/nanomagnetics.com/nanoport, published Sep. 5, 2015, as retrieved Sep. 27, 2017.

(Continued)

*Primary Examiner* — Frantz Coby

(57) ABSTRACT

In an embodiment, a mobile electronic device comprises: a transceiver; at least one magnetic connector; connectedness detection circuitry operable to dynamically detect a connection event at each of the at least one magnetic connector; and a processor, coupled to the connectedness detection circuitry, operable to: automatically establish a communications link, via the transceiver, with an other electronic device upon detection, by the connectedness detection circuitry, of the connection event at a predetermined set of the at least one magnetic connector; send, from the mobile electronic device to a remote server, a request for access to a hardware resource of the other electronic device; and based on a positive response from the remote server, access, via the wireless communications link, a hardware resource of the other electronic device.

17 Claims, 19 Drawing Sheets

(51) Int. Cl.
  *H04W 76/14* (2018.01)
  *H04W 4/80* (2018.01)
  *H04L 29/08* (2006.01)
  *H01R 13/62* (2006.01)
  *H04M 1/02* (2006.01)
  *H04M 1/725* (2006.01)
  *H01F 7/02* (2006.01)

(52) U.S. Cl.
  CPC ........ *H04L 67/1097* (2013.01); *H04L 67/125* (2013.01); *H04L 67/18* (2013.01); *H04L 67/306* (2013.01); *H04M 1/026* (2013.01); *H04M 1/7253* (2013.01); *H04W 4/80* (2018.02); *H04W 76/14* (2018.02)

(58) Field of Classification Search
  USPC ................................. 709/218, 225, 227, 228
  See application file for complete search history.

(56) References Cited

U.S. PATENT DOCUMENTS

| | | | | |
|---|---|---|---|---|
| 8,253,518 | B2* | 8/2012 | Lauder | G06F 1/1647 |
| | | | | 206/320 |
| 8,395,465 | B2* | 3/2013 | Lauder | H01F 7/04 |
| | | | | 206/320 |
| 8,498,100 | B1* | 7/2013 | Whitt, III | G06F 1/1618 |
| | | | | 361/679.17 |
| 8,665,044 | B2* | 3/2014 | Lauder | G06F 1/1626 |
| | | | | 206/320 |
| 9,312,633 | B1 | 4/2016 | Szeto | |
| 9,348,365 | B2 | 5/2016 | Gilllis | |
| 9,426,905 | B2* | 8/2016 | Bathiche | G06F 1/1626 |
| 9,653,844 | B1 | 5/2017 | Szeto | |
| 9,774,136 | B2 | 9/2017 | Szeto | |
| 9,948,719 | B2* | 4/2018 | Szeto | H04W 76/14 |
| 9,954,571 | B2* | 4/2018 | Sartee | G06F 1/16 |
| 10,236,106 | B2* | 3/2019 | Lauder | H01F 7/04 |
| 2006/0079180 | A1* | 4/2006 | Sinivaara | H04B 5/00 |
| | | | | 455/41.2 |
| 2009/0113221 | A1* | 4/2009 | Holle | G06F 1/189 |
| | | | | 713/310 |
| 2011/0192857 | A1* | 8/2011 | Rothbaum | B25F 1/00 |
| | | | | 220/694 |
| 2012/0295451 | A1* | 11/2012 | Hyun-Jun | H01R 13/6205 |
| | | | | 439/39 |
| 2013/0082919 | A1 | 4/2013 | Jano | |
| 2013/0145142 | A1 | 6/2013 | Sainath | |
| 2013/0145143 | A1 | 6/2013 | Sainath | |
| 2014/0055945 | A1* | 2/2014 | Sudak | H02G 3/02 |
| | | | | 361/679.41 |
| 2015/0065069 | A1 | 3/2015 | McCormack | |
| 2016/0241076 | A1 | 8/2016 | Bowers | |
| 2016/0268729 | A1 | 9/2016 | Szeto | |
| 2016/0306396 | A1* | 10/2016 | Bathiche | G06F 1/1626 |
| 2017/0257147 | A1 | 9/2017 | Szeto | |

OTHER PUBLICATIONS

Baig, Edward C., "Moto phones let you snap on speaker, projectors, power", URL: www.usatoday.com/story/tech/columnist/baig/2016/06/09/moto-phones-let-you-snap-speaker-projectors-po published Jun. 9, 2016, as retrieved Sep. 27, 2017.

Hachman, Mark, "Moto Mod snap-on modules turn the Moto Z into a convertible smartphone", URL: www.greenbot.com/article/3081537/smartphones/the-moto-zs-snap-on-moto-mod-modules-make-it-the-firs published Jun. 9, 2016, as retrieved Sep. 27, 2017.

* cited by examiner

CONTROLLING ACCESS TO A HARDWARE RESOURCE OF AN ELECTRONIC DEVICE BY A MAGNETICALLY ATTACHABLE ELECTRONIC DEVICE

CROSS-REFERENCE TO RELATED APPLICATIONS

The present application claims the benefit of prior U.S. provisional application Ser. No. 62/258,463 filed Nov. 21, 2015, the contents of which are hereby incorporated by reference hereinto.

TECHNICAL FIELD

The present disclosure relates to controlling access to a hardware resource of an electronic device by a magnetically attachable electronic device.

BACKGROUND

An electronic device, such as a mobile device (e.g. a smartphone), may incorporate one or more magnetic connectors. Magnetic connectors for interconnecting devices, and examples of devices incorporating such connectors, are described in international patent publication no. WO/2015/070321 and U.S. patent publication no. 2016-0268729 A1, the contents of each of which are incorporated by reference.

As detailed in the above-referenced publications, magnetic connectors may be used to establish a physical connection between two or more devices. In some embodiments, the magnetic connectors may facilitate or effect transmission of data or power between the physically connected devices, e.g. via electrical contacts, or wirelessly (e.g. using an RF transceiver or optical signaling element).

A device may be comprised of a variety of hardware components. Some hardware components are for receiving sensory input (i.e. sensors) or user input and may thus be referred to as "input resources." Examples of input resources include sensors such as microphones, cameras, or accelerometers, and user input resources such as touchscreens or buttons. Other hardware components produce sensory output or perform work may and thus be referred to as "output resources." Examples of output resources include components that generate visual output (e.g. indicators or display screens), components that generate auditory output (e.g. speakers), components that generate tactile output (e.g. haptic feedback generators such as vibrating elements), and actuators (e.g. motors or solenoids). Collectively, input resources and output resources may be referred to as "I/O resources." I/O resources are forms of hardware resources. A device may include a combination of input resources and output resources.

Different types of devices may incorporate different types of hardware resources. For example, a smartphone may incorporate such input resources as a touchscreen, a still/video camera, an accelerometer, a global positioning system (GPS) receiver, and a microphone, and such output resources as visual indicators (e.g. LEDs), a display (e.g. an LCD that forms part of the touchscreen), a haptic feedback generator (e.g. vibrating element), and a speaker. In contrast, a portable gaming system may incorporate input resources comprising a touchscreen, an accelerometer, and buttons, and output resources comprising only a display and a speaker. In this example, the set of hardware resources available at the smartphone differs from, but overlaps with, the set of hardware resources available at the portable gaming system. In other examples, the set of hardware resources available at different devices may be wholly distinct.

Although the devices in the above example (i.e. a smartphone and a portable gaming system) are both portable devices, it will be appreciated that non-portable electronic devices, such as vehicles, home appliances, and consumer electronics, among others, may similarly incorporate a variety of hardware resources that may differ between devices.

SUMMARY

According to one aspect of the present disclosure, there is provided a method at a mobile electronic device having at least one magnetic connector, the method comprising: upon magnetic attachment of the mobile electronic device to an other electronic device using the at least one magnetic connector, detecting a connection event at each of the at least one magnetic connector used for the magnetic attachment; in response to the detecting, automatically establishing a communications link between the mobile electronic device and the other electronic device; sending, from the mobile electronic device to a remote server, a request for access to a hardware resource of the other electronic device; and based on a positive response from the remote server, accessing, from the magnetically attached mobile electronic device, via the communications link, the hardware resource of the other electronic device.

In some embodiments, the request for access comprises a unique ID of a hardware resource of the other electronic device to which access is sought.

In some embodiments, the request for access comprises a unique ID of the other electronic device containing the hardware resource to which access is sought.

In some embodiments, the request for access further comprises a user ID, or user profile ID, of a user associated with the mobile electronic device.

In some embodiments, the sending, from the mobile electronic device to the remote server, of the request for access to the hardware resource of the other electronic device occurs prior to the magnetic attachment of the mobile electronic device to the other electronic device.

The method may additionally comprise receiving a positive response from the remote server and, based on the positive response, storing at the mobile electronic device an indication of the hardware resource to which access is granted.

In some embodiments, the sending, from the mobile electronic device to the remote server, of the request for access to the hardware resource of the other electronic device occurs while the mobile electronic device is magnetically attached to the other electronic device.

In another aspect, there is provided a mobile electronic device comprising: a transceiver; at least one magnetic connector; connectedness detection circuitry operable to dynamically detect a connection event at each of the at least one magnetic connector; a processor, coupled to the connectedness detection circuitry, operable to: automatically establish a communications link, via the transceiver, with an other electronic device upon detection, by the connectedness detection circuitry, of the connection event at a predetermined set of the at least one magnetic connector; send, from the mobile electronic device to a remote server, a request for access to a hardware resource of the other electronic device; and based on a positive response from the remote server, access, via the wireless communications link, a hardware resource of the other electronic device.

In some embodiments, the at least one magnetic connector comprises a plurality of magnetic connectors.

In some embodiments, the predetermined set of the magnetic connectors comprises a subset of the plurality of magnetic connectors.

In some embodiments, the predetermined set of the magnetic connectors comprises all of the magnetic connectors of the plurality.

In a further aspect, there is provided a cloud server comprising: a network interface controller; and a processor operable to: receive, via the network interface controller, a request, from a mobile electronic device having at least one magnetic connector, for access to a hardware resource of an other electronic device, the other electronic device having at least one complementary magnetic connector selectively attachable to the magnetic connector of the mobile electronic device for mutual magnetic attachment of the devices, the request containing a unique ID associated with the other electronic device; based at least upon on the unique ID in the request, determining access rights to the hardware resource for the mobile electronic device; and based on the determined access rights to the hardware resource, sending to the mobile electronic device, via the network interface controller, one of a positive response indicating that access to the hardware resource is granted and a negative response indicating that access to the hardware resource is denied.

In some embodiments, the request from the mobile electronic device contains a user profile ID and the access rights are specific to a user profile associated with the user profile ID.

In some embodiments, the request from the mobile electronic device contains a user ID and the access rights are specific to a user associated with the user ID.

In some embodiments, the request from the mobile electronic device contains a device ID of the mobile electronic device and the access rights are specific to the mobile electronic device.

In some embodiments, the access rights to the hardware resource specify a time limit for the mobile electronic device to access the hardware resource of the other electronic device. The time limit may be user-specific or user profile-specific.

In some embodiments, the unique ID in the request is a device ID of the other electronic device.

In some embodiments, the unique ID in the request is an ID of the hardware resource to which access is sought.

Other features will become apparent from the drawings in conjunction with the following description.

DETAILED DESCRIPTION

In this disclosure, the terms "left," "right," "top," "bottom" and "behind" should not be understood to necessarily imply any particular required orientation of a device or component during use. In this disclosure, the term "cylindrical magnet" should be understood to include cylindrical magnets whose heights are smaller than their radii, which magnets may alternatively be referred to as "disk magnets." In this disclosure, the term "cylindrical magnet" should be understood to include hollow cylindrical magnets, including annular or tubular magnets. Any use of the term "exemplary" should not be understood to mean "preferred."

Figure 1:
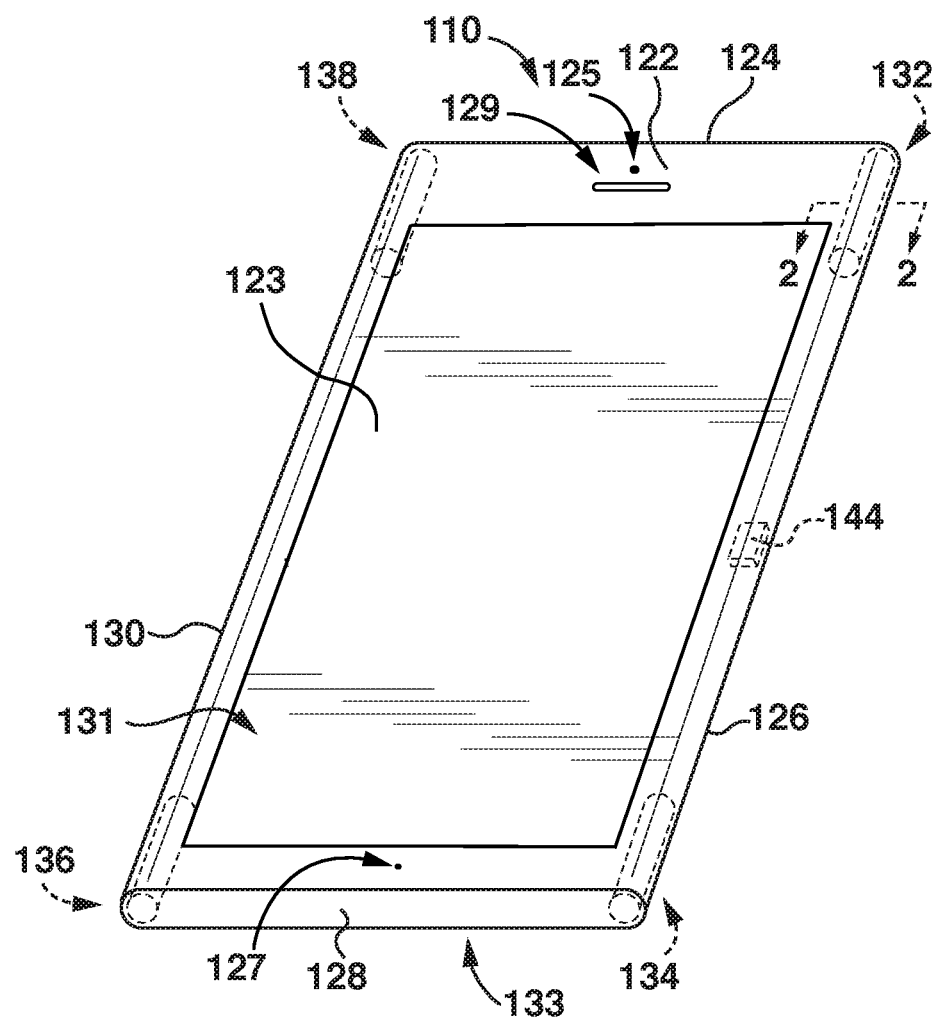
FIG. 1 is a perspective view of a mobile electronic device that is magnetically attachable to another electronic device to form a hybrid electronic device in which hardware resources can be shared between the devices.

Referring to FIG. 1, an exemplary mobile electronic device (or "electronic device" or simply "device") 110 is schematically illustrated in perspective view. In the present example, the device 110 is a smartphone. In alternative embodiments, the device 110 could be another form of mobile electronic device having processing capabilities, such as a wireless organizer, pager, personal digital assistant, computer, laptop, handheld wireless communication device, wirelessly enabled notebook computer, portable gaming device, smart watch or tablet computer. In some embodiments, mobile electronic devices can also include without limitation, peripheral devices such as displays, printers, touchscreens, projectors, digital watches, cameras, digital scanners and other types of auxiliary devices, which are not necessarily mobile or portable, that may communication or otherwise wirelessly engage with another device. It will be appreciated that the exact function of the device 110 of FIG.

1 is not central and that other types of devices besides the ones specifically enumerated above may be used.

The device 110 has a housing 122 with a generally flat cuboid shape. The housing 122 may be made from a non-conductive material such as plastic. The housing 122 has four straight edges 124, 126, 128 and 130, a front face 131, and a rear face 133. Each of the edges and faces maybe considered as a surface of the device. In the present embodiment, top edge 124 and bottom edge 128 are flat, and lateral edges 126 and 130 are rounded. The lateral edges 126 and 130 may be referred to as straight rounded edges. The rounding of edges 126, 130 may be for aesthetic, ergonomic, or functional reasons, or a combination of these. In the present embodiment, the straight rounded edges 126, 130 have a semi-circular profile or cross section. In other embodiments, the straight rounded edges of a device, to the extent that they are present, may have different profiles (e.g. semi-elliptical, parabolic, quarter-circular, quarter-elliptical, or otherwise). Housings of alternative device embodiments may have non-cuboid shapes.

The device 110 incorporates various input resources and output resources. In the present disclosure, the term "input resource" refers to a hardware resource for receiving sensory input (i.e. a sensor) or a hardware resource for receiving user input, and the term "output resource" refers to a hardware resource that generates sensory (e.g. visual, auditory, or tactile) output or performs work.

The input resources of device 110 include a touchscreen 123, a still/video camera 125 comprising a charge-coupled device (CCD) image sensor, and a microphone 127. The output resources of device 110 include the display portion of touchscreen 123 (e.g. an LCD, LED or OLED screen) and a speaker 129. The I/O resources of device 110 are conventionally coupled to, and controlled by, a processor of device 110, which is not expressly shown in FIG. 1.

The device 110 also incorporates a transceiver 144. Transceiver 144 is a hardware component for transmitting data to, or receiving data from, another device. In the present embodiment, the transceiver 144 is an antenna. As such, the transceiver 144 may alternatively be referred to as antenna 144.

The antenna 144 of the present embodiment is suitable for transmitting and receiving an ultra short range wireless signal. The term "ultra short range" refers to a wireless signal having an effective range of a few millimeters to a few centimeters between complementary transmit and receive antennas. As will be appreciated, the device 110 is operable to use the transceiver 144 for communicating with a proximate electronic device to which device 110 has been attached using magnetic connectors, described below. In some embodiments, the transceiver 144 could be a longer range wireless transceiver (e.g. a Wi-Fi™ antenna) that may also be used to communicate with a remote server for access control purposes (described below).

Depending upon the embodiment, the antenna 144 may operate using a single frequency, a narrow band, or a wide band (e.g., the ultra-wide band of 3.1 to 10.6 Ghz), to name several examples. In some embodiments, the antenna may be an extremely-high frequency (e.g., 30-300 Ghz) antenna, e.g., as described in U.S. Patent Publication No. 2015/0065069, which is hereby incorporated by reference. In some embodiments, the antenna may be a monopole or dipole antenna. Physically, the antenna may have a cuboid shape, as depicted in FIG. 1 at 144, but the shape may vary in other embodiments. In some embodiments, the antenna may be a chip antenna (e.g., ceramic), e.g. having a footprint of only a few square millimeters.

Four magnetic connectors 132, 134, 136 and 138 are disposed at the four corners of the device 110 respectively. In other embodiments, there may be fewer connectors per device (e.g., two rather than four), and the connectors may be placed elsewhere than the corners.

Each magnetic connector is designed to self-align and interconnect with a complementary magnetic connector (i.e. mating connector) when the connectors are brought into proximity with one another. Each of the magnetic connectors 132, 134, 136 and 138 uses one or more magnets to achieve this self-aligning effect and to interconnect complementary magnetic connectors once aligned. The magnetic connectors may for example be as described in International PCT publication WO 2015/070321, U.S. patent publication no. 2016-0268729 A1, U.S. Pat. No. 9,312,633, and/or U.S. patent application Ser. No. 15/134,660 filed Apr. 21, 2016, the contents of each of which are hereby incorporated by reference, or as otherwise described herein.

Figure 8:
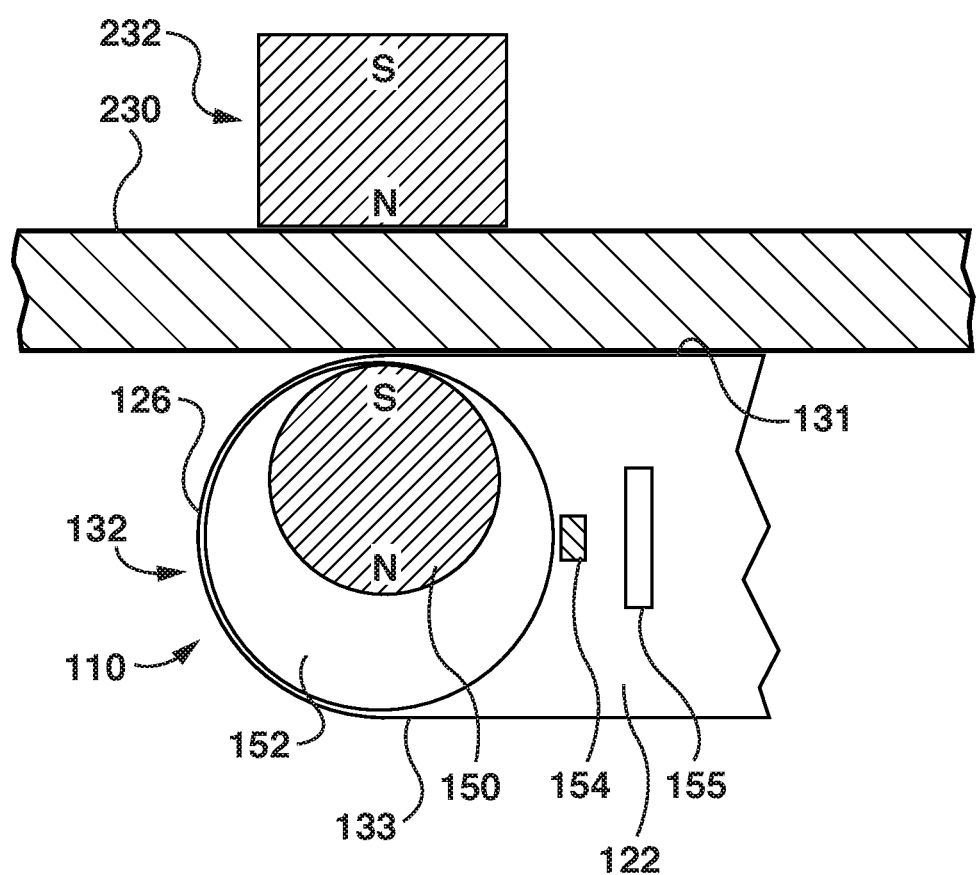
FIG. 8 is a partial cross-sectional view of an exemplary magnetic connector of the mobile electronic device of FIG. 1 in a connected state, taken along line 8-8 of FIG. 7.

In the embodiment illustrated in FIG. 1, each of the magnetic connectors 132, 134, 136 and 138 comprises a cylindrical magnet movable between a stowed position and a deployed position when the magnetic connector is in a disconnected and connected state, respectively. This is illustrated in FIGS. 2 and 8, respectively, for a representative one of the magnetic connectors.

Figure 2:
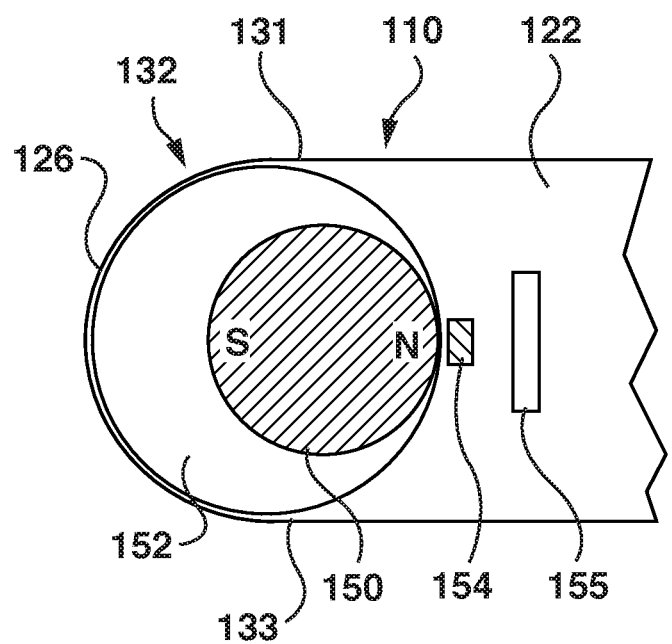
FIG. 2 is a partial cross-sectional view of an exemplary magnetic connector of the device of FIG. 1 in a disconnected state.

Referring to FIG. 2, a partial cross-sectional view of exemplary magnetic connector 132 of device 110, in a disconnected state, illustrates internal components of the connector. The magnetic connector 132 includes magnet 150 within a cavity 152 defined within the housing 122.

Magnet 150 is a cylindrical magnet. The magnet 150 may be a permanent magnet made from a ferromagnetic material, such as neodymium-iron-boron, samarium-cobalt, iron, nickel, or other suitable alloy. In this example, the magnet 150 is diametrically magnetized, such that one semicylinder presents a north pole (shown as N in FIG. 2) and the other semicylinder presents a south pole (shown as S in FIG. 2). In alternative embodiments, other forms or types magnets, such as spherical magnets, could be used.

Cavity 152 is a cylindrical cavity with a diameter larger than that of magnet 150. The relative sizes of the magnet 150 and the cavity 152 permit limited movement of the former within the latter.

In the disconnected state of magnetic connector 132 that is depicted in FIG. 2, the magnet 150 is in a stowed position. When in the stowed position, the magnet 150 is positioned within cavity 152 away from lateral edge 126 and approximately midway between the front face 131 and rear face 133 of the device 110, i.e. at the 3 o'clock position of cavity 152 in FIG. 2. The magnet 150 attains this position by default due to a biasing element situated within the housing 122. In the present embodiment, the biasing element is a ferrous stop 154 fixed (e.g. embedded) in a wall of the cavity 152 at the innermost extent of cavity 152 midway between front face 131 and rear face 133. The stowed position is stable, i.e. the magnet 150 maintains this position when subjected to nominal inertial forces during normal use of mobile electronic device 110.

The magnet 150 imparts an attractive magnetic force upon ferrous stop 154. In the absence of overwhelming opposing force acting upon magnet 150 e.g. from a proximate complementary magnetic connector, the magnet 150 moves to the stowed position within cavity 152, closest to ferrous stop 154. The ferrous stop 154 thus biases magnet 150 inwardly away from lateral edge 126, and midway between front face 131 and rear face 133, i.e. in the stowed position of the magnet, when the magnetic connector is in a disconnected state. This may reduce magnetic flux at the immediately surrounding surfaces of housing 122 (e.g. at edge 126), which might otherwise undesirably attract nearby loose metal objects such as keys. The biasing effect of the ferrous stop can be tuned, e.g. by adjusting its size or a distance to magnet 150, so that magnet 150 is drawn away only by another magnet or large ferrous object, and not by the presence of small nearby ferrous objects.

Ferrous stop 154 may be made from an unmagnetized ferromagnetic material, such as iron, cobalt or nickel or other ferrous material (e.g., steel, other alloys) or other ferromagnetic material having a high susceptibility to magnetization. Such ferromagnetic material may be considered to already be magnetic on an atomic level. Within a magnetic domain (group of atoms), the magnetization may be uniform, however, the magnetic domains may not be aligned with each other. An externally imposed magnetic field applied to an unmagnetized ferromagnetic material can cause the magnetic domains in the material to line up with each other, and the ferromagnetic material may then be said to be magnetized. The magnetic field of the magnetized ferromagnetic material may be lost with time as the magnetic domains return to their original unaligned configuration. This may therefore be considered as a temporary magnet. Other forms of biasing elements besides ferrous stops could be used in alternative embodiments.

A connected state of magnetic connector 132 is depicted in FIG. 8, which is discussed below.

The magnetic connector 132 further includes a connectedness sensor 155 for sensing the connectedness state of the magnetic connector 132. In the present embodiment, the sensor 155 achieves this result by sensing a position of magnet 150 within cavity 152: when magnet 150 is sensed to be in the stowed position of FIG. 2, the connectedness sensor 155 outputs a signal indicative of a disconnected state; otherwise, the sensor 155 outputs a signal indicative of a connected state.

The connectedness sensor 155 may be one of a variety of sensor types. In some embodiments, the connectedness sensor 155 may be a Hall-effect sensor that senses magnetic flux density and varies its output voltage based on the sensed magnetic flux density. When the magnetic connector 132 is in a disconnected state, such that magnet 150 is in the stowed position within cavity 152 (see FIG. 2), then the Hall-effect sensor 155 may detect a relatively high magnetic flux density due to the proximity of the magnet 150 and may set its output voltage accordingly. Conversely, when the magnetic connector 132 is in a connected state, such that magnet 150 is in a deployed position within cavity 152 (e.g. as in FIG. 8), i.e. further away from the Hall-effect sensor 155, then the magnetic flux density detected by the sensor 155 may be diminished, and the Hall-effect sensor 155 may vary its output voltage accordingly.

Alternative embodiments of magnetic connector may use other forms of sensors or means for sensing connectedness. In one example, an electrical circuit may be closed or opened when the magnet is in the stowed position or a deployed position, respectively. This may be achieved through closure of a switch that is biased open by default and closed by the magnet when in the stowed position, or by the bridging of two contacts in the cavity by the magnet when in the stowed position. In such embodiments, a resistor connected between a voltage source Vcc and the switch or one of the two contacts, respectively, may be used to yield the desired output voltages for the connected and disconnected states.

In another embodiment, the connectedness sensor 155 may comprise one or more force sensors within the cavity for detecting the position of magnet 150 within the cavity 152. A force sensor may sense the force of the magnet 150 being pressed against it when the magnet is attracted to a complementary magnetic connector proximate to device 110. The force sensor may be, for example, a piezo-resistive force sensor, such as model FLX-A101-A marketed by Tekscan™ or similar, or a piezo-electric force sensor. The force sensor may be sensitive to approximately 1 newton (N) or less.

Additional detail regarding at least some of these connectedness detection sensors or circuits is available in U.S. patent application Ser. No. 15/292,311, filed Oct. 13, 2016, and U.S. Patent Application No. 62/327,826, filed Apr. 26, 2016, which are hereby incorporated by reference hereinto. Other forms of sensors could alternatively be used to detect a connectedness state of the magnetic connector. These may include electronics, apparatus or structure for monitoring one or more other electrical, magnetic, optical or physical parameters at the magnetic connector to ascertain the state of the connector.

Referring back to FIG. 1, the other magnetic connectors 134, 136 and 138 of device 110 may have a similar structure to magnetic connector 132, described above.

Device 110 also includes other hardware and software components for facilitating sharing of hardware resources between device 110 and another device upon mutual magnetic attachment of the devices using magnetic connectors 132, 134, 136 and 138. These additional components are not shown in FIG. 1, but they are depicted in the schematic diagram of FIG. 3.

Figure 3:
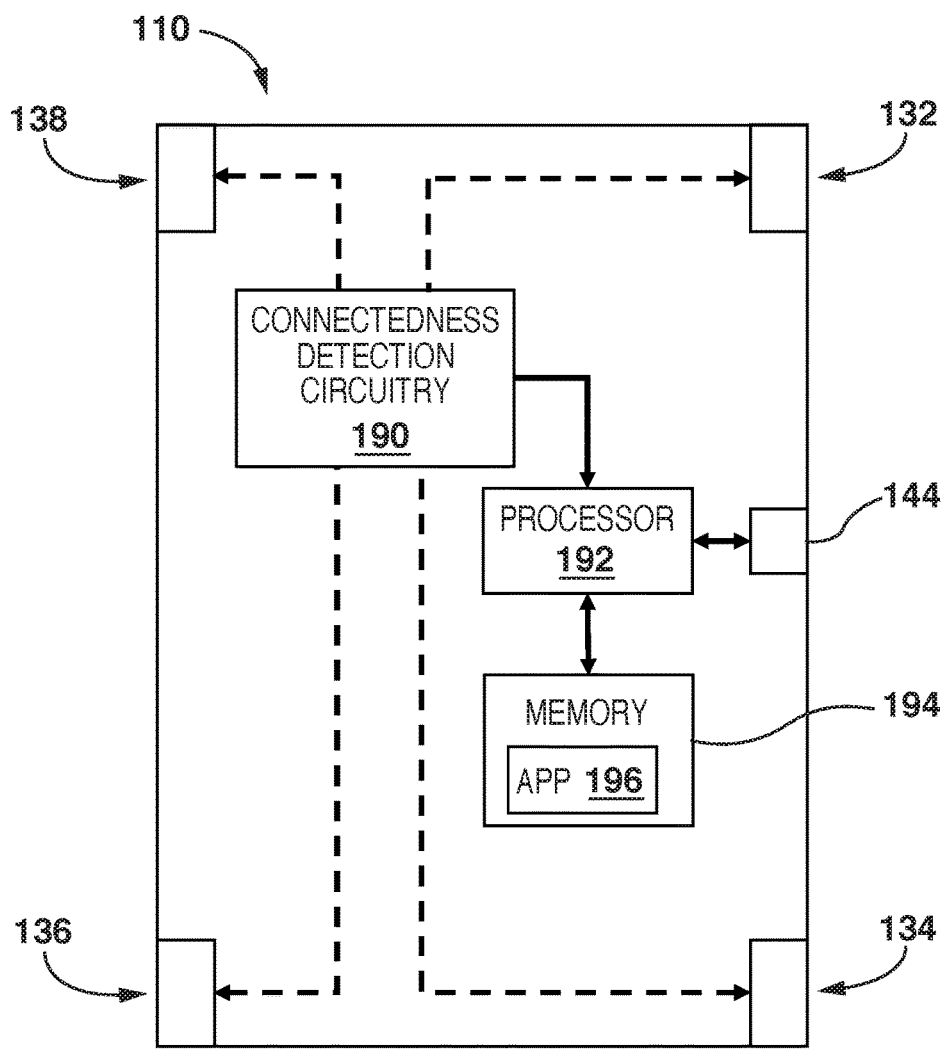
FIG. 3 is a schematic diagram of the mobile electronic device of FIG. 1.

Referring to FIG. 3, device 110 is schematically depicted. FIG. 3 adopts a convention whereby device components are depicted as blocks and relationships between component are depicted as arrows between blocks. When an arrow is depicted using a solid line, the component at the tail end of the arrow either controls or provides data to the component at the head of the arrow. When an arrow is depicted using a dashed line, the component at the tail of the arrow senses a condition of the component at the head of the arrow. For clarity, the I/O resources 123, 125, 127 and 129 shown in FIG. 1 are omitted from FIG. 3.

As illustrated, device 110 includes connectedness detection circuitry 190, a microprocessor 192, memory 194 and application software (or "app") 196.

Connectedness detection circuitry 190 is operable to dynamically sense a current connectedness state of each of magnetic connectors 132, 134, 136 and 138 and to use this information to generate an output signal indicative of whether the device 110 is presently interconnected with (i.e. magnetically attached to) another electronic device. In FIG. 3, the sensing is represented by the four dashed arrows extending from the connectedness detection circuitry 190 to the four magnetic connectors 132, 134, 136 and 138, respectively.

In the present embodiment, the output signal of the connectedness detection circuitry 190 is determined by circuitry that embodies the following Boolean logic:

$$\text{output} = \text{connected state}_{132} \wedge \text{connected state}_{134} \wedge \text{connected state}_{136} \wedge \text{connected state}_{138} \quad (1)$$

wherein:
connected state$_M$ denotes the connectedness state of magnetic connector reference numeral M (logic 1=connected, logic 0=disconnected); and ∧ represents a logical AND.

Per equation (1) above, the connectedness detection circuitry 190 of the present embodiment outputs a "logic 1" signal indicating that device 110 is in a connected state when all four magnetic connectors 132, 134, 136 and 138 are in a connected state, and a "logic 0" signal indicating that device 110 is in a disconnected state otherwise. In other words, the circuitry deems the device 110 to be magnetically attached to another device only when all four of its magnetic connectors are in a connected state. Other embodiments may employ different Boolean logic, e.g. indicating a connected state of device 110 when predetermined subsets of the magnetic connectors are in a connected state. In general, for each embodiment, there will be a predetermined set of one or more magnetic connectors at the device (or perhaps more than one predetermined set) that will be considered to evidence a magnetic attachment of the mobile electronic device 110 to the other electronic device. The predetermined set of magnetic connectors may be all of the magnetic connectors or a subset thereof.

For example, in one embodiment, when device 110 connects side-by-side with another device, the predetermined set may comprise the two connectors along one straight rounded edge. Based on which of the connectors have transitioned into a connected state, the connectedness detection circuitry 190 can also determine which side another device has connected to device 110. In another embodiment, the predetermined set may consist of the two magnetic connectors 132, 138 disposed at the top edge of mobile electronic device 110, which may be sufficient to bear the weight of the mobile electronic device 110 regardless of whether magnetic connectors 134, 136 are connected.

Although depicted as a discrete logical block in FIG. 3, it will be appreciated that the connectedness detection circuitry 190 may be distributed, in whole or in part, within the housing of device 110. For example, in the present embodiment, the circuitry 190 incorporates the connectedness sensor forming part of each of the four magnetic connectors 132, 134, 136 and 138, including the connectedness sensor 155 of magnetic connector 132 (see FIG. 2). The connectedness detection circuitry 190 may be implemented in various ways, e.g. using programmable logic devices such as complex programmable logic devices (CPLDs) or field-programmable gate arrays (FPGAs), or in a software routine executed on the processor of device 110 (described below). In the present embodiment, an output of the connectedness detection circuitry 190 is connected to an interrupt pin of the processor 192, for reasons that are set forth below. The connectedness detection circuitry 190 could also be implemented as part of processor 192, with the connected state inputs tied directly to input pins of the processor.

Processor 192 is a microprocessor generally responsible for controlling the operation of device 110. Its responsibilities include managing device subsystems such as I/O resources 123, 125, 127 and 129 (FIG. 1), controlling inter-device communication via transceiver 144 and possibly other transceivers, and launching software applications responsive to stimuli such as user input via touchscreen 123. Processor 192 may execute conventional mobile device operating system software, such as iOS™ 10.x or Android™ 7.0, to facilitate these ends. Examples of processors that may be used for this purpose, at the time of this writing, including the Apple® A9, Qualcomm® Snapdragon™ 820, and Intel® Atom™ X7 processors.

Memory 194 is volatile and/or non-volatile memory for storing, among other things, operating system software (not expressly depicted) and application software such as application 196. The memory 194 may for example be one or more of random access memory (RAM), read-only memory (ROM) such as erasable programmable read-only memory (EPROM) or electrically-erasable programmable read-only memory (EEPROM), flash memory, or the like.

Figure 4:
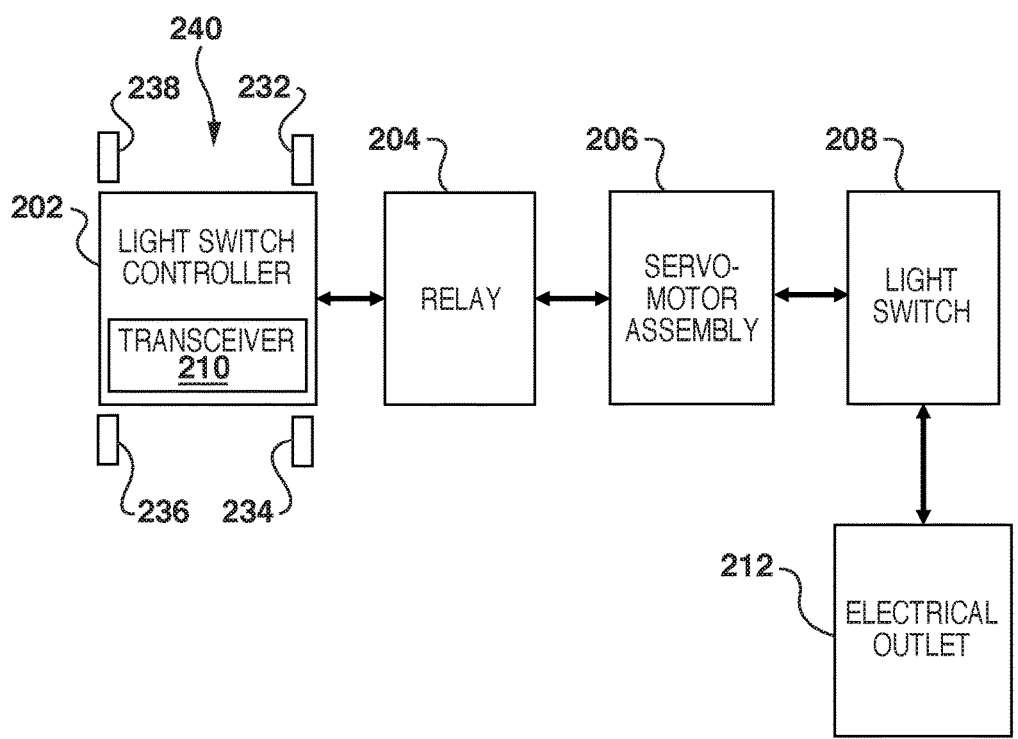
FIG. 4 is a schematic diagram of another electronic device to which the mobile electronic device of FIG. 1 can be magnetically attached.

FIG. 4 schematically depicts a simple electronic device 200 to which electronic device 110 (smartphone) of FIG. 1 can be magnetically attached to form a hybrid or amalgamated device that shares the hardware resources between devices. Fundamentally, the device 200 is a mechanical light switch for controlling a conventional household electrical outlet. However, the mechanical light switch has been customized to additionally provide for electronic activation/deactivation of the mechanical light switch 208 and status sensing. Notably, the device 200 defines a tap point for optional magnetic attachment of device 110. When magnetically attached at the tap point, the device 110 effectively merges with the device 200 and provides an alternative mechanism for controlling (writing to), and determining the status of (reading from), the light switch 208.

It will be appreciated that device 200 is a straightforward example for illustration purposes. Other, more complex devices could be similarly designed with tap points for magnetic attachment of device 110 for forming hybrid electronic devices in which hardware resources are shared between devices. This may be done across a wide range of devices and applications, as will be described.

As illustrated in FIG. 4, the electronic device 200 comprises a light switch controller 202, a relay 204, a servomotor assembly 206, a mechanical light switch 208, and an electrical outlet 212.

Light switch controller 202 is a controller operable to output electrical signals for turning light switch 208 on or off in response to electronic "on" or "off" commands respectively. The commands are received at the controller 202 from an external source, e.g. device 110, via a transceiver 210. The transceiver 210 is compatible with the transceiver 144 of device 110 in this example. Although the transceiver 210 is depicted as part of the controller in FIG. 4, they could be separate devices. The controller 202 may for example be an ATmega328P microcontroller.

Relay 204 is a conventional relay that opens and closes an electrical switch (separate from mechanical switch 208) based on an electrical signal. The relay 204 is used to drive the servomotor assembly 206.

Servomotor assembly 206 comprises a servomotor with an attached lever arm (not expressly depicted). The lever arm is mechanically coupled to the mechanical light switch 208 and can be moved back and forth by suitable activation of the servomotor via relay 204. The movement opens or closes the rocker-style mechanical light switch 208 (from the rear, so that these components are not visible to the user) to turn on or turn off power to electrical outlet 212. This is done without any human interaction with the mechanical switch 208, which may otherwise be conventional.

It will be appreciated that, in example device 200, the light switch controller 202, relay 204, servomotor assembly 206, mechanical light switch 208 and electrical outlet 212 are all output resources (see above definition), which are forms of hardware resources. However, in the present embodiment, only the light switch controller 202 is accessible to magnetically attached mobile electronic devices such as device 110. The remaining hardware resources of device 200 are not accessible to magnetically attached devices, at least not directly. Rather, the remaining devices of device 200 are driven by the controller 202.

The device 200 of FIG. 4 further includes four magnetic connectors 232, 234, 236 and 238. These magnetic connectors are positioned in fixed relation to the transceiver 210. The magnetic connectors 232, 234, 236 and 238 and transceiver 210 collectively define a notional tap point 240 for at which electronic devices, such as mobile electronic device 110, can be magnetically attached in order to "merge" with device 200, to form a hybrid electronic device.

Figure 5:
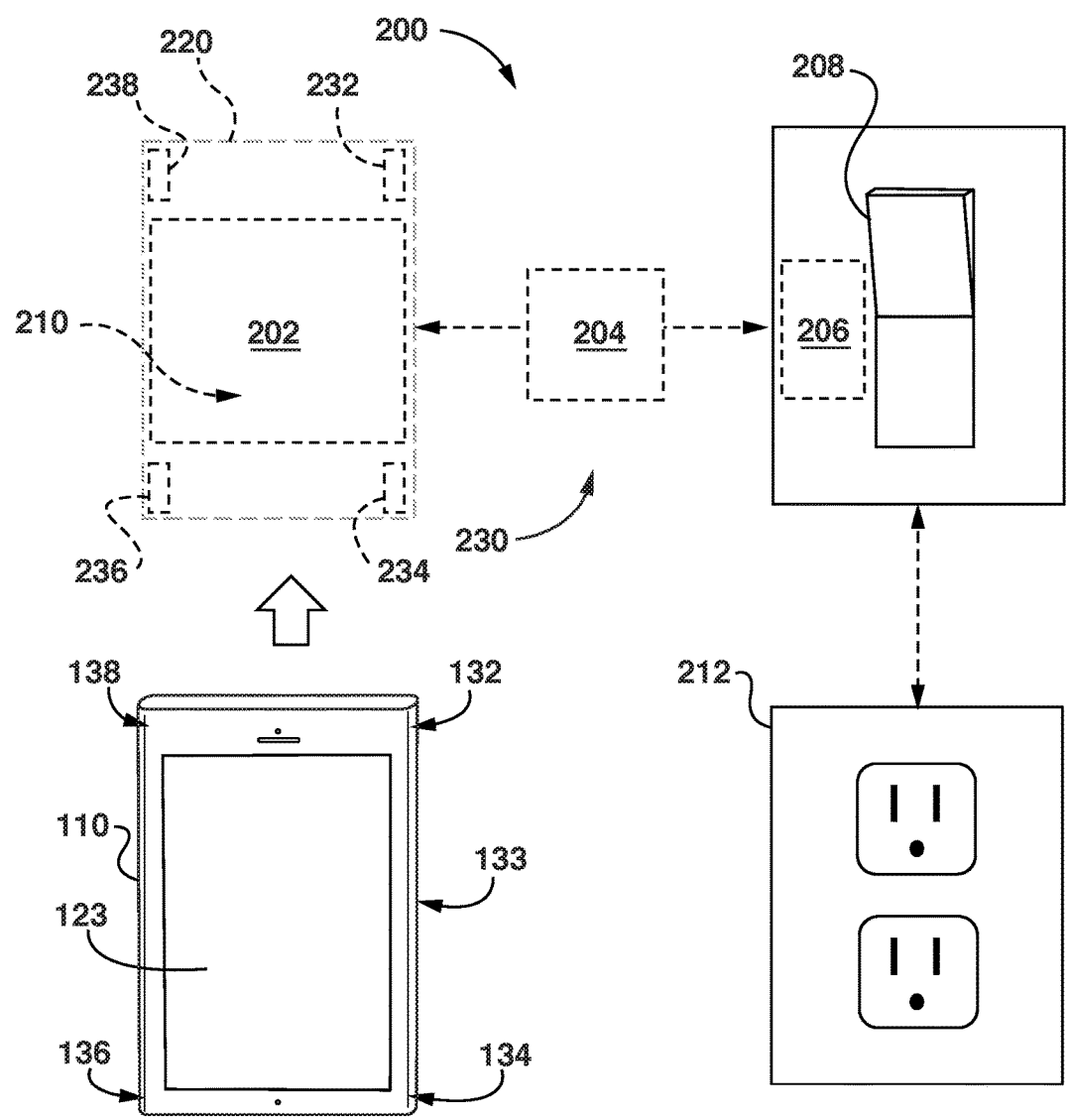
FIG. 5 is a perspective view of the electronic device of FIG. 4 in one example physical implementation.

FIG. 5 is a perspective view illustrating one possible physical implementation of device 200. In FIG. 5, the device 200 has been installed in a wall 230. Other installations or arrangements are possible.

As shown in FIG. 5, light switch controller 202 and transceiver 210 are fixedly mounted behind a surface of the wall 230, e.g. behind a drywall layer. Four magnetic connectors 232, 234, 236, 238 are similarly mounted behind a surface of wall 230. The magnetic connectors collectively define a substantially rectangular mounting area or "wall mount" 220. The wall mount 220 is a physical implementation of the notional tap point 240 of FIG. 4. The wall mount 220 may optionally be marked as such for easy identification by a user facing wall 230.

The arrangement and spacing of the magnets 232, 234, 236 and 238 within wall mount 220 is similar to that of magnetic connectors 132, 134, 136 and 138 of device 110 (FIG. 1) to facilitate a one-to-one alignment of complementary magnetic connectors. In some embodiments, the magnet spacing may be standardized to support magnetic attachment of different makes or types of devices with device 200.

The light switch controller 202 is electrically coupled to the relay 204, which in turn is electrically coupled to the servomotor assembly 206. All of these components are disposed behind a surface of wall 230 and are thus not visible to a user facing wall 230.

The servomotor assembly 206 is mechanically coupled to the mechanical light switch 208 as earlier described. The light switch 208 and the electrical outlet 212 are electrically coupled in a conventional manner.

Figure 6:
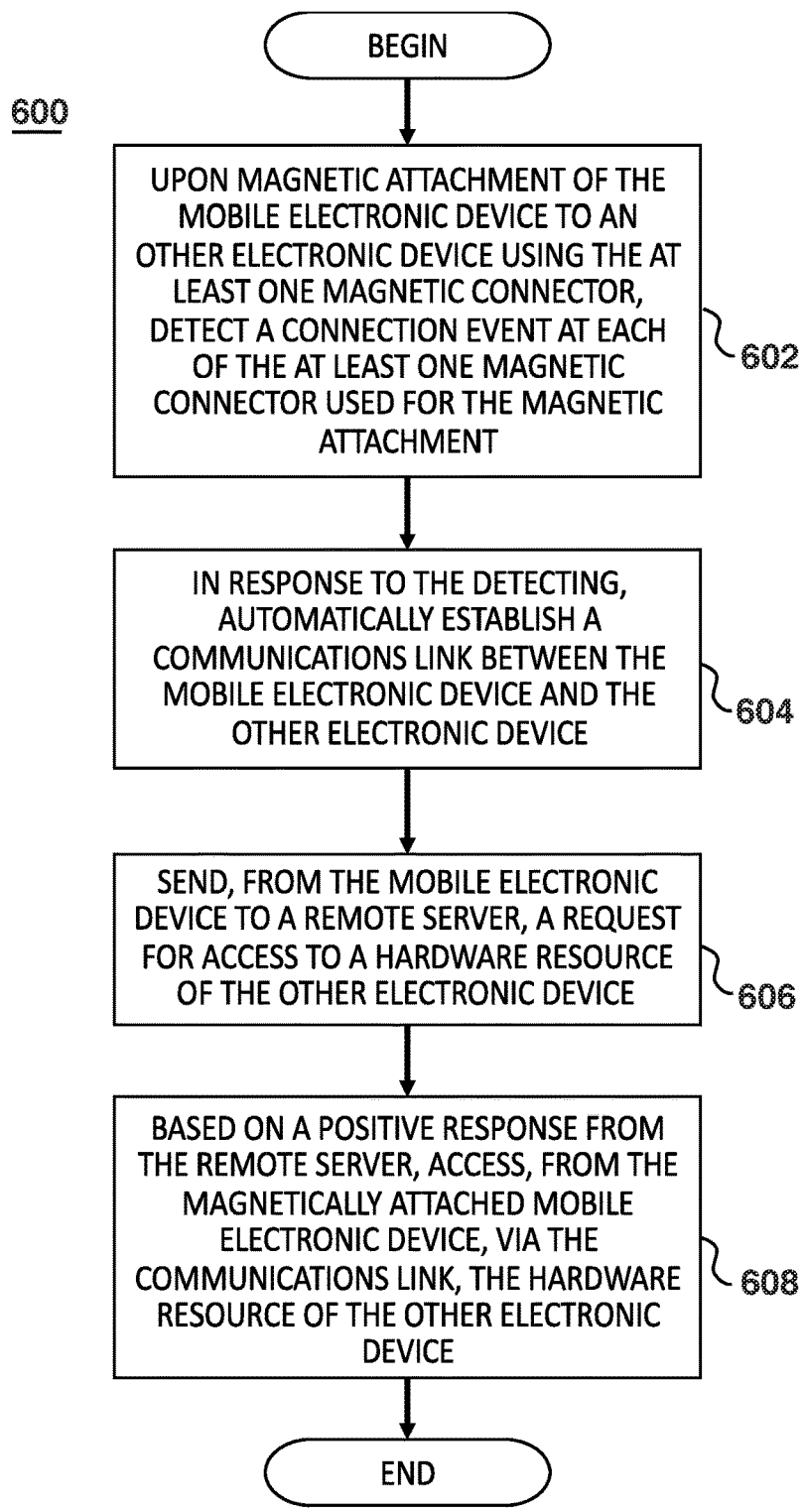
FIG. 6 is a flowchart of operation of the mobile electronic device of FIG. 1.

Operation 600 of mobile electronic device 110 for facilitating the sharing of hardware resources between the device 110 and another electronic device, upon their mutual magnetic attachment, is depicted in the flowchart of FIG. 6. It is presumed that the devices 110 and 200 are initially in the state depicted in FIG. 5, i.e. device 110 is not magnetically attached to the device 200, before operation 600 is commenced.

Figure 7:
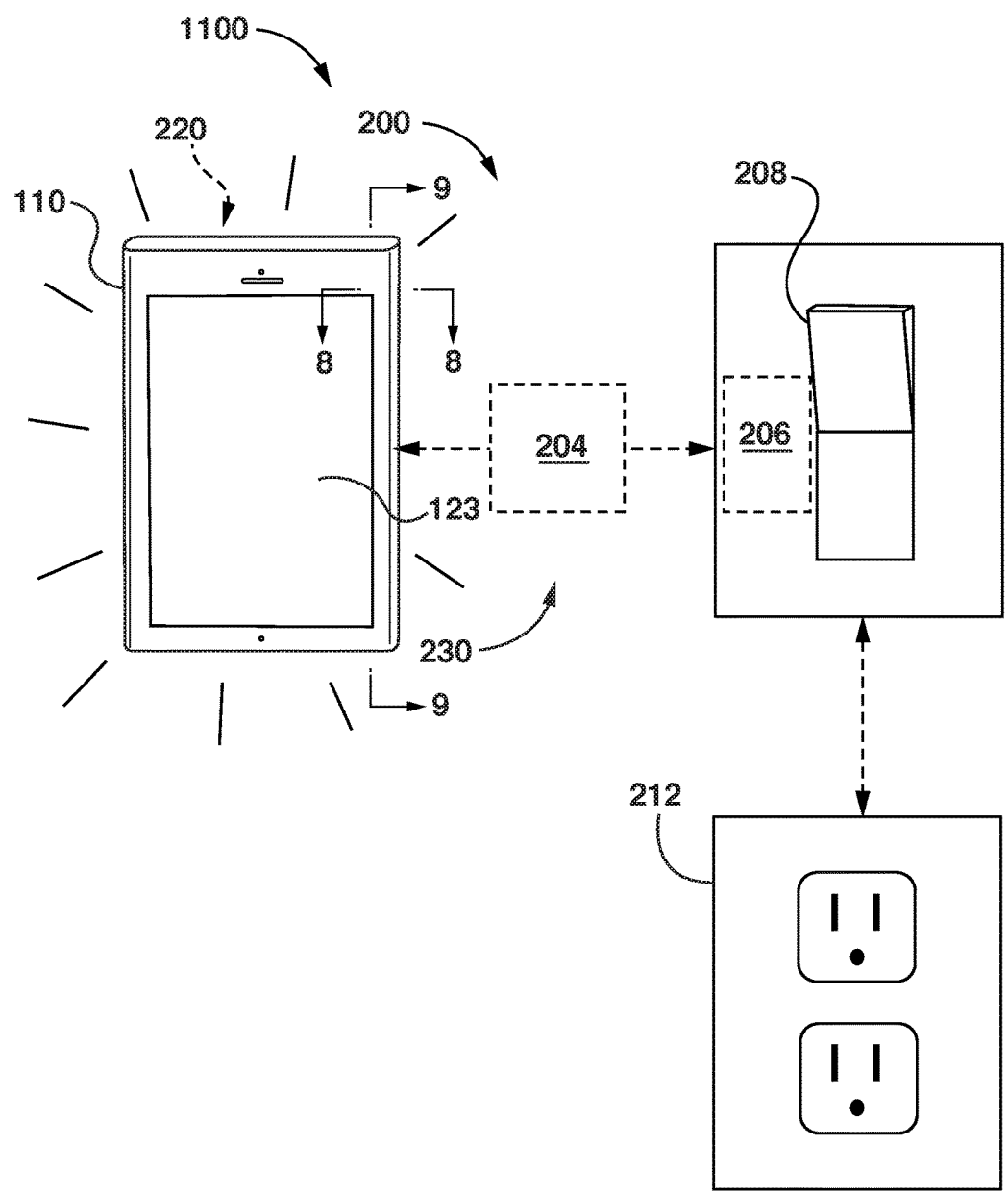
FIG. 7 is a perspective view of a hybrid electronic device formed from the mobile electronic device of FIG. 1 and the electronic device of FIG. 5.

A user desirous of using mobile electronic device 110 to control power to the electrical outlet 212 may hold device 110 at or near the wall mount 220 with touchscreen 123 facing outwardly (see FIG. 5). When the device 110 is held sufficiently close to wall mount 220, the four magnetic connectors 132, 134, 136 and 138 will self-align and interconnect with the four respective magnetic connectors 232, 234, 236 and 238 in wall mount 220, establishing a physical connection between the rear face 133 of the electronic device 110 and wall mount 220 (the wall mount 220 being considered to form a part of the device 200). The mobile electronic device 110 may appear to suddenly align and attach itself to the wall 230 at mounting area 220, as depicted in the perspective view of FIG. 7.

The weight of mobile electronic device 110 may be fully supported by the magnetic attachment at wall mount 220. The physical connection between the devices may be sufficiently strong to persist despite any application of nominal external force upon mobile electronic device 110 during normal user interaction with the device during operation (e.g., touching or swiping of touchscreen 123).

When the device 110 has been attached to wall mount 220, each of its magnetic connectors will be in a connected state. An example magnetic connector 132 in the connected state is schematically depicted in the cross sectional view of FIG. 8, which is taken along line 8-8 of FIG. 7.

As illustrated in FIG. 8, magnetic attraction by magnetic connector 232 behind wall 230 has caused magnet 150 to leave its stowed position in favor of the deployed position shown in the figure. In the deployed position, the magnet 150 is positioned at the 12 o'clock position of cavity 152 as it appears in FIG. 8, with the south pole of magnet 150 aligned with the north pole of magnetic connector 232.

The other magnetic connectors 134, 136 and 138 will behave similarly with their respective complementary magnetic connectors 234, 236 and 238. Movement of the magnet of each magnetic connector 132, 134, 136 and 138 from its stowed position to a deployed position may be considered to evidence a "connection event" at each connector.

Upon magnetic attachment of the mobile electronic device 110 to the other electronic device 200 using the magnetic connectors 132, 134, 136 and 138, the four connection events (one per magnetic connector) are detected by the connectedness sensors at each magnetic connector (operation 602, FIG. 6). In view of the Boolean logic of equation (1) above, the connectedness detection circuitry 190 (FIG. 3) at device 110 concludes that the mobile electronic device 110 has been magnetically attached to another electronic device. As a result, the connectedness detection circuitry 190 outputs a signal to the interrupt pin of the processor 192 of device 110 (FIG. 3). This triggers execution of code in the operating system of device 110, e.g. in the form of an interrupt service routine of a driver routine associated with connectedness detection circuitry 190, and the driver routine launches application software 196 (FIG. 3). Thus, the app 196 launches automatically upon magnetic attachment of the device 110 to the wall mount 220, i.e. upon mutual magnetic attachment of the two electronic devices 110 and 220.

When launched, the application software 196 establishes a communications link between the mobile electronic device 110 and the other electronic device 200 to which it is magnetically attached, i.e. the communications link is automatically established in response to the detecting of the four connection events (operation 604, FIG. 6). This communications link will permit communication directly between mobile electronic device 110 and device 200.

The steps involved in establishing a communications link between magnetically attached devices may vary between embodiments, depending upon the operative communication protocol(s) (e.g. Bluetooth™, Near-field communication, or TransferJet™ for wireless connections, USB 3.X for wired connections, etc.), and depending upon whether the connection is wireless or wired.

In some embodiments, the establishment of a communications link may entail a handshaking phase. In the case of a wireless communication protocol such as Bluetooth™, handshaking may entail progression through a series of states including inquiry (determining each other's addresses) and paging (forming a connection using the addresses), with one device becoming a master and the other a slave.

If the connection between devices is a wired connection (e.g. using electrical contacts at each magnetic connector) such as USB 3.X rather than a wireless connection, then the steps for establishing a communications link may differ. For example, one step may simply be establishing electrical conductivity between devices in accordance with the protocol (e.g. ensuring alignment and connectivity of each of the VCC, GND, D+ and D− pins). Another step, specific to USB, may be to send a reset signal to the newly connected device, e.g. to determine the speed of the USB device. Subsequently, the sending device may read the other device's information, and the other device may be assigned a unique 7-bit address.

In the case of wireless devices, as in the present example, operation 604 may involve initially causing a wireless interface to become enabled at each of the devices. For example, transceiver 144 of device 110 may become enabled by the driver routine that launches app 196. Similarly, the transceiver 210 of device 200 may become enabled in response to a mechanism at device 200 (not illustrated) for detecting the magnetic attachment of device 110, e.g. via connectedness sensors such as Hall-effect sensors, force sensors, optical sensors, or the like, at device 200. Alternatively, the transceivers 144 and/or 210 may be enabled by default.

In some embodiments, the wireless or wired communications link may be partially disabled or otherwise limited at either one or both of electronic devices 110 and 200 until handshaking completes. In one example, the magnetic connectors may be selectively enabled, e.g., through software control of electromagnetic elements.

In some embodiments, the establishment of a communications link in operation 604 may entail selectively enabling interfaces and/or drivers under software control.

Figure 9:
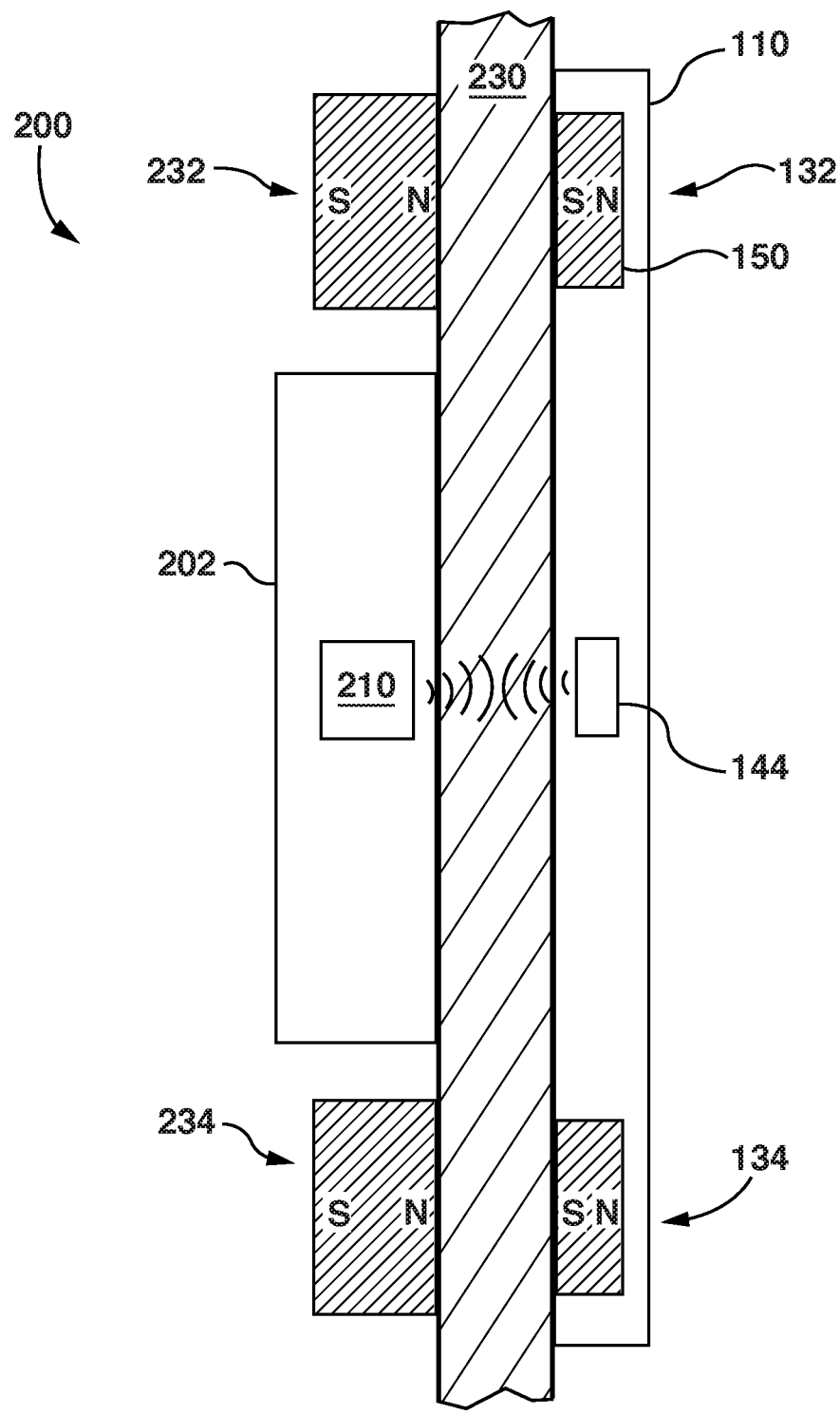
FIG. 9 is a cross-sectional view of the mobile electronic device of FIG. 1 magnetically attached to the electronic device of FIG. 5, taken along line 9-9 of FIG. 7.

In the present embodiment, the alignment of complementary magnetic connectors conveniently aligns the transceiver 144 of electronic device 110 with the transceiver 210 of electronic device 200, to facilitate ultra short range wireless communication between them. The alignment is depicted in the cross-sectional view of FIG. 9, which is taken along line 9-9 of FIG. 7. As a result of the alignment, the transceiver 144 can reliably receive ultra short range wireless signals transmitted through wall 230 by the transceiver 210, and vice versa. The use of ultra short range transceivers may provide at least one of the following benefits: enhanced security through use of a wireless signal whose an ultra short range limits opportunities for eavesdropping; reduced interference with other components (e.g. transmit or receive antennas) within the same device and/or in nearby devices; and reduced power consumption in comparison to longer range antennas that might otherwise be used to transmit wireless signals between the devices.

Once the communications link has been established via transceivers 210 and 144, it may be considered that a hybrid (amalgamated) electronic device has been formed. The hybrid electronic device comprises the two electronic devices 110 and 200 mechanically connected to one another using magnetic connectors (directly, e.g. without intervening cables), as well as being electrically connected to one another.

Figure 10:
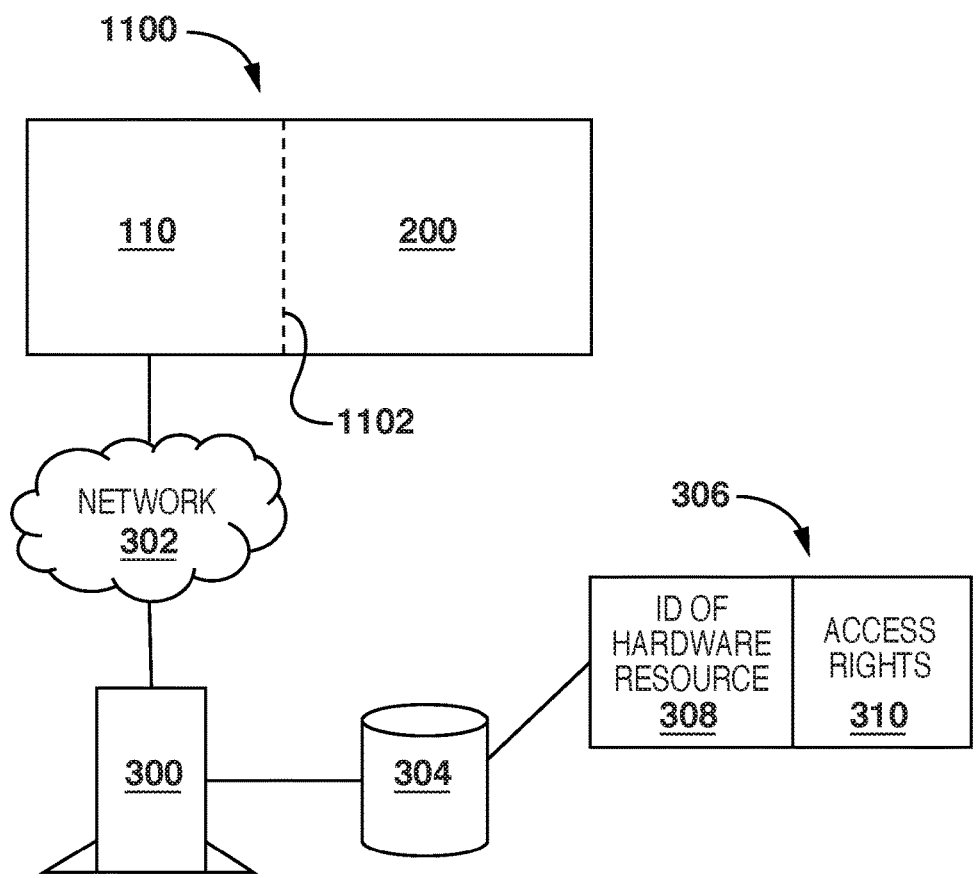
FIG. 10 is a schematic view of the hybrid electronic device of FIG. 7 with other example system components.

Referring to FIG. 10, the hybrid electronic device 1100 is schematically depicted as a single block, with devices 110 and 200 being represented as substituents of the block that are connected at a dashed line 1102. The dashed line 1102 represents a connection of the substituent devices that is both mechanical (physical) and electrical. The mechanical connection provides a stable attachment of devices 110 and 200 during use of the devices. The electrical connection allows data and/or power to be transferred between devices 110 and 200.

Figure 11:
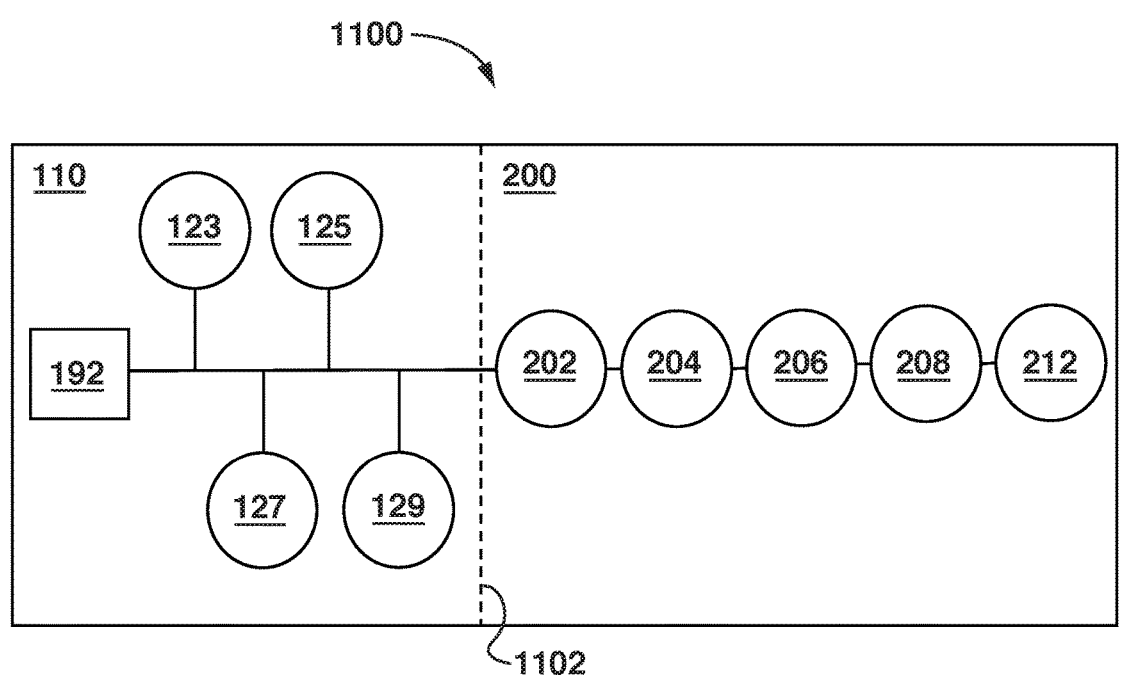
FIG. 11 is a schematic view of the hybrid electronic device of FIG. 7 in isolation.

Referring to FIG. 11, the hybrid electronic device 1100 is schematically depicted in greater detail in isolation. As illustrated, the mobile electronic device 110 has a variety of hardware resources under the control of processor 192, including touchscreen 123, camera 125, microphone 127 and speaker 129 (hardware resources being denoted as circles in FIG. 11). Additionally, processor 192 is also able to control hardware resources at the other electronic device 200 to which mobile electronic device 110 is magnetically attached, including relay 204, mechanical light switch 208 and outlet 212, all via light switch controller 202, by executing app 196 (FIG. 3).

In a subsequent operation, the mobile electronic device 110 initially sends, to an access control server, a request for access to the hardware resource of the other electronic device 200 (operation 606, FIG. 6), as follows.

Firstly, the mobile electronic device 110 uses the newly established communications link with device 200 to request and receive, from device 200, a unique ID of the hardware resource(s) to which access is desired. In this example, controller 202 responds to the request by returning the unique ID of device 200, which implicitly identifies light switch controller 202 (the only accessible hardware resource in the device 200) as the hardware resource to which access is sought. The returned ID may generally be considered as a unique ID associated with the device 200, and could in alternative embodiments be (or include) a unique ID of the hardware resource itself.

In some embodiments, the device 200 could be broadcasting its ID, in which case no request would need to be expressly made.

Secondly, the mobile electronic device 110 generates an access request message comprising the unique ID associated with the device 200, as received from device 200, which identifies the hardware resource to which access is sought. As noted above, the unique ID in the present example is the ID of the device 200 itself, but in alternative embodiments could be the ID of the hardware resource to which access is sought (or in some embodiments, the IDs of multiple hardware resources).

In the present embodiment, the access request message also includes, in addition to the unique ID of the device 200, either or both of a device ID of mobile electronic device 110 and a user ID (or user profile ID) of a user associated with mobile electronic device 110. The access request message is transmitted to an access control server 300 (see FIG. 10).

In the present embodiment, the device 110 communicates with the server 300 via a network 302, which may for example be a local area network (LAN), a wide area network (WAN), or the internet. Communication with network 302 may be controlled by device 110 using a wireless interface, such as a radio interface (e.g. for communication over a cellular data channel), a Wi-Fi™ interface, or otherwise, at device 110, which may or may not be the same as transceiver 144 (see FIG. 3). Any number of other instances of mobile electronic devices (not expressly depicted in FIG. 10), whether presently forming part of a hybrid electronic device like device 1100 of FIG. 11 or otherwise, may similarly communicate with server 300.

Figure 20:
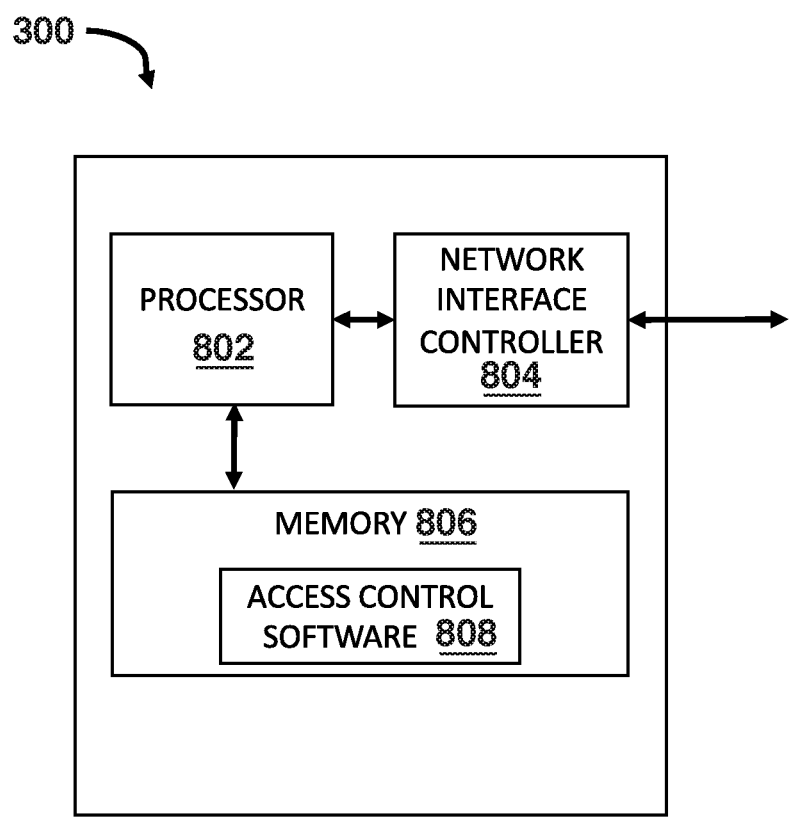
FIG. 20 is a schematic diagram of the access control server component of FIG. 10.

Referring to FIG. 20, a schematic diagram of an example access control server 300 is depicted. Server 300 may be a cloud server component of a server farm in a cloud computing platform such as Amazon® Web Services (AWS), IBM® Softlayer™ or Microsoft® Azure™. The server 300 comprises a processor 802 communicatively coupled to a network interface controller 804 and memory 806. The network interface controller 804 facilitates communication of the server 300 with remote users, and may be built into a motherboard of the server 300. The memory 806 stores access control software 808, which communicates with database 304 (FIG. 10, described below) to ascertain access rights for hardware resources for the purpose of responding to access control requests. The access control software 808 may be implemented using Ruby On Rails, a server-side web application framework, or using the .Net framework, PHP, or Python, to name several examples.

Upon receiving the access request from device 110, the access control server 300, which may be a cloud-based server, executes access control software 808 to ascertain whether the request to access the light switch controller 202 should be granted. The software 808 may use the unique ID of the device 200 (or in some embodiments, of light switch controller 202 i.e. of the hardware resource to which access is sought) to key into a database 304 storing access control records for a variety of hardware resources in respect of a variety of users and/or devices that may wish to access the hardware resources.

The database 304 may be a conventional (e.g., relational or object-oriented) database. In one embodiment, the database is a PostgreSQL™ database. Alternative embodiments may be another form of SQL database, such as MySQL or Microsoft® SQL.

In the present example, the database 304 stores one or more records 306 which associate the unique ID of the hardware resource 308 with access rights 310 for the user profile and/or device whose ID is included in the request. The access rights 310 could be organized for classes of users, or classes of device. In some embodiments, there could simply be default access rules for all users/devices, e.g., to allow access to resources to any connected device.

Based on this information, the access control server either grants or denies the request by way of a positive or negative response message, respectively, to the electronic device 110, sent via network interface controller 804 (FIG. 20). In the present example, it is presumed that the response message contains a positive response in the form of a token indicative of which hardware resources of device 200, if any, to open up to device 110. The token could be cryptographically signed by the access control server 300, so that the device 200 can trust the token.

Upon receiving the token, the mobile electronic device 110 (under control of app 196—see FIG. 3) presents the token to the device 200. Based on the token, the device 200 opens up access to its hardware resources, specifically the light switch controller 202, to device 110. The mobile electronic device 110 may now communicate with (read from or write to) the light switch controller 202, via the established communications link.

Initially, the communication may constitute reading from light switch controller 202 to ascertain a current state of the mechanical light switch 208. In the present example, this communication reveals that the mechanical light switch 208 is in an "off" position. As such, the app 196 may present a graphical representation 1104 of a virtual light switch in the "off" position on the display portion of touchscreen 123, along with a textual indication of switch status. This is depicted in the perspective view of FIG. 12. This scenario exemplifies the manner in which the mobile electronic device 110 can read (receive data from) a hardware resource (i.e. light switch controller 202) of the other electronic device 200 to which it is magnetically attached via the communications link between devices 110 and 200.

The example app 196 may further be configured to receive user input, via touchscreen 123, to control the mechanical light switch 208 via light switch controller 202. This is illustrated in the perspective view of FIG. 13.

In particular, a user may command the mechanical light switch 208 to turn on power to electrical outlet 212 by appropriately touching the virtual light switch 1104 on the touchscreen 123 of electronic device 110. In response, the app 196 may refresh its virtual light switch 1104 to depict the "on" position and send a suitable "on" command to light switch controller 202 via the communications link with device 200. In turn, the light switch controller 202 may appropriately control relay 204 to cause the mechanical light switch 208 to be thrown by servomotor assembly 206, as shown in the perspective view of FIG. 14. As a result, the electrical outlet 212 is powered on. This scenario exemplifies the manner in which the mobile electronic device 110 can control (or write to) a hardware resource (here, mechanical light switch 208 via light switch controller 202) of the other electronic device 200 to which it is magnetically attached.

Thus, the magnetically attached mobile electronic device 110 is able to access the light switch 208 via controller 202 (both being forms of hardware resources of the electronic device 200), via the communications link, based on the positive response from the access control server 300 (operation 608, FIG. 6).

Notably, if the user had interacted with the mechanical switch 208 manually, e.g. by pressing the top of the mechanical switch 208 to activate the power outlet 212, instead of using the virtual light switch 1104 to do so, the mobile electronic device 110 would be apprised of this change. This may for example be achieved using the following mechanism: when manual operation of the switch changes the position of the above-mentioned lever arm, this may be sensed by controller 210 (e.g., via an optical/pressure sensor), causing the controller 210 to send a message to device 110. In the result, the app 196 would be able to refresh itself appropriately to depict the virtual light switch 1104 in an "on" state. Thus, the virtual light switch 1104 and the mechanical light switch 208 will mirror one another, in terms of their states, in the present embodiment.

Although useful for illustration, it will be appreciated that the presence of redundant switches on a wall—one mechanical, the other virtual—may be considered impractical. In an alternative embodiment, the mechanical light switch could be omitted, and the power to the electrical outlet 212 (or indeed to any powered device) could be controlled by relay 204. This may provide a form of access control for controlling the powered device. For example, if the powered device were a sensitive or expensive piece of electronic equipment, removal of mobile electronic device 110 from wall mount 220 between uses may prevent unknown passers-by from undesirably controlling the equipment, due to the absence of any fixed mechanical controls.

In some embodiments, the mobile electronic device 110 can be dismounted from the wall mount 220 and yet continue to control the light switch 208, e.g., once the user has carried the phone elsewhere. In such embodiments, it may be practical or necessary to use different transceivers 144 and 210 in devices 110 and 200 respectively than what is described above, having a greater range.

Figure 12:
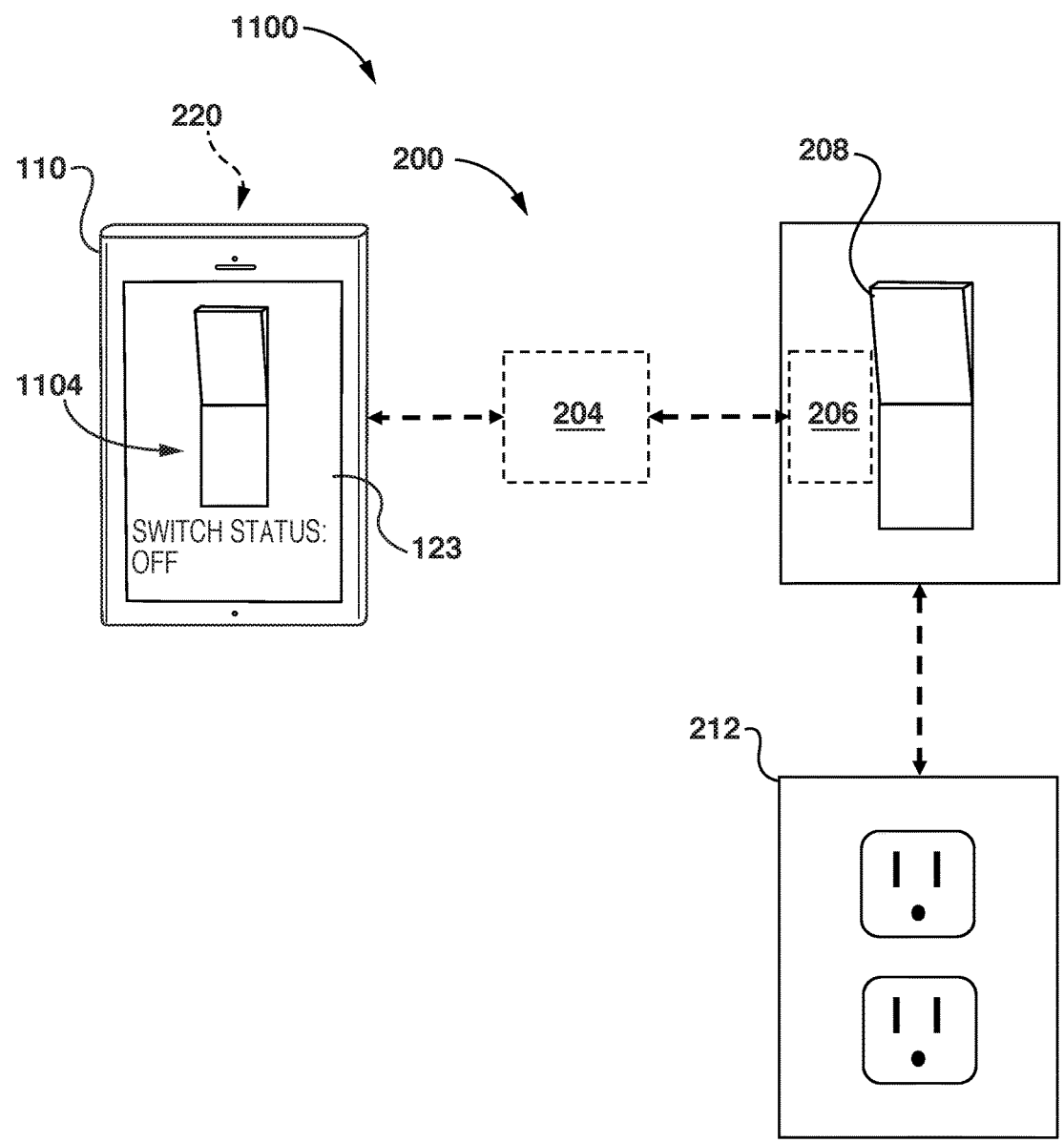
FIGS. 12, 13 and 14 are perspective views of the hybrid electronic device of FIG. 7 at different stages of operation.
Figure 13:
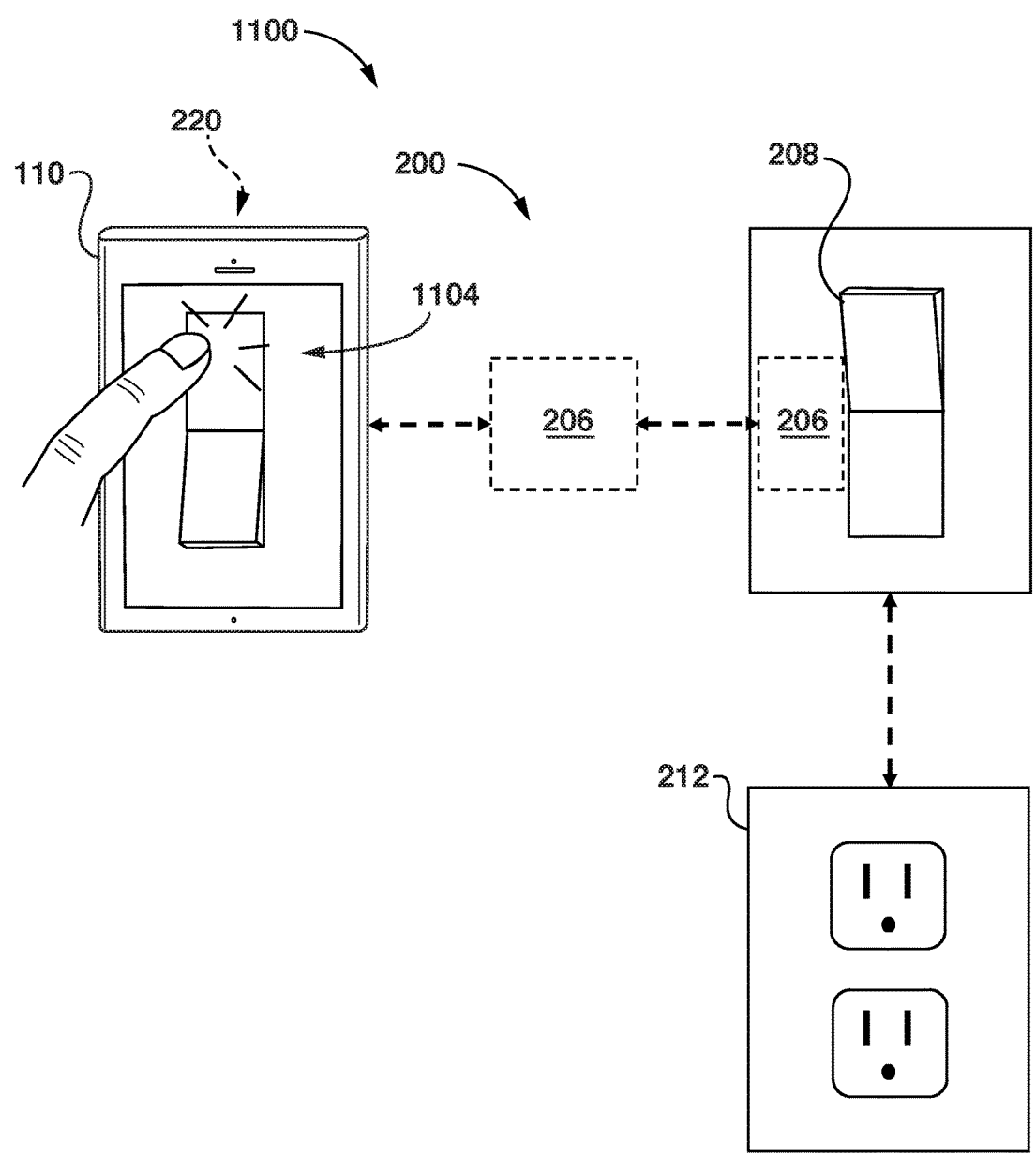
Figure 14:
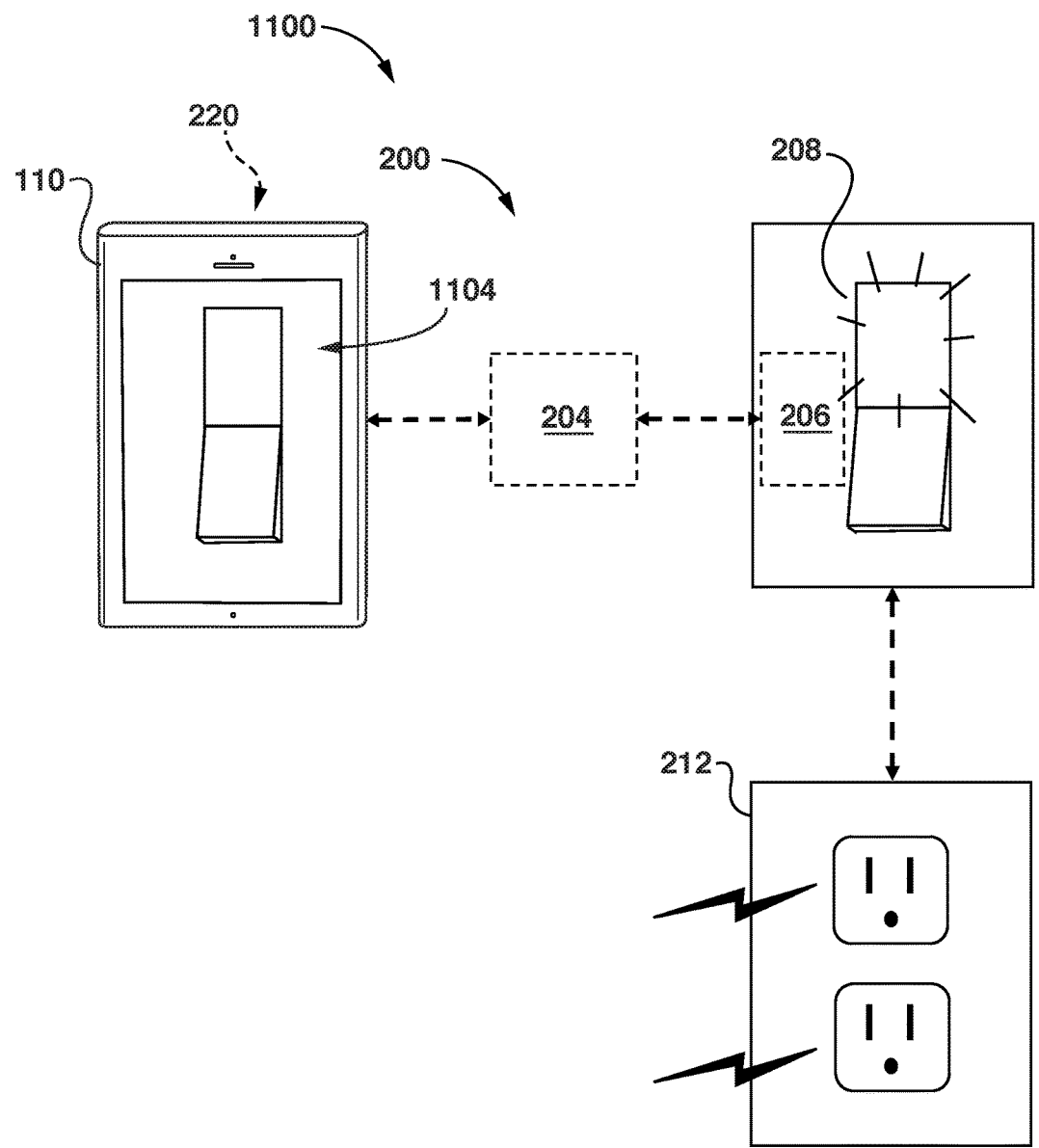

The virtual switch 1104 depicted in FIGS. 12-14 provide a simplistic example of a virtual control mechanism for a straightforward hardware resource, i.e. mechanical light switch 208. It will be appreciated that the hardware resources and control mechanisms of alternative embodiments may be more complex.

As an example, an alternative embodiment of device 200 may comprise a thermostat controller electrically coupled to a thermostat that is embedded in a wall. If mobile electronic device 110 were magnetically attached to such a device, e.g. at a wall mount similar to wall mount 220, the mobile electronic device may launch a different app with a more robust graphical user interface for controlling the thermostat. The thermostat interface could permit the user to view and control various system parameters, such as current temperature, preprogrammed thermostat schedules, historical settings, and so on. Virtually any control interface for a programmable device could be reproduced on a graphical user interface at the mobile electronic device. Any necessary equipment for controlling the hardware resource and implementing user commands (e.g. controllers, relays, actuators, etc.) could be embedded in a wall, out of sight of a user, with only a wall mount being (optionally) visible. In some cases, the wall mount could be intentionally hidden for aesthetic or security purposes.

In the above-described example embodiment, operation 606 (FIG. 6) for accessing the hardware resource of another electronic device involved, among other steps, initially requesting access to the hardware resource from an access control server. It will be appreciated that this is not required in all embodiments. For example, in some embodiments, the mobile electronic device may immediately access the hardware resource upon establishment of the communications link between the mutually magnetically attached electronic devices. In other words, sufficient access permissions may be presumed or automatically provided, e.g. on a device-specific, device-type specific, user-specific, or universal basis. Other embodiments may locally store access control information, at mobile electronic device 110, indicating whether access to the hardware resource is permitted, thereby eliminating a need for accessing a separate server. In some cases, if the device ID of device 200 is known in advance, device 110 may request access in advance (before mutual magnetic attachment of the devices) from the remote server 300 and store an access token, and present the token to device 200 once they connect.

In some embodiments, access may be provided to all of the hardware resources of a device or a subset thereof. In some embodiments, access may be bidirectional, i.e. each electronic device may be given access to some or all of the hardware resources of the other electronic device.

It will be appreciated that the formation of a hybrid or amalgamated device using the techniques described herein may allow for combination of distinct hardware resources from each electronic device into an electrically (e.g. communicatively) and mechanically (physically) unified whole. This may permit actions to be taken that would be impossible at each electronic device independently from the other.

For example, if each device has a sensor or actuator that has no counterpart at the other device, then the hybrid device may be able to actuate the actuator that is unique to one substituent electronic device based on an environmental condition sensed by the sensor that is unique to the other substituent electronic device. In another example, if each device has a microphone but neither has a directional microphone (i.e. a microphone capable of "beam steering" to focus on sound emanating from a particular source and tune out other noise), the formation of the hybrid electronic device upon magnetic attachment of the two electronic devices may allow at least a rudimentary form of directional microphone to be formed, e.g. using the two microphones and knowledge of their inter-microphone separation distance upon mutual magnetic attachment of the devices.

The mobile electronic device 110 could be magnetically attached to a variety of other types of electronic devices besides example electronic device 200. These may for example include household appliances, vehicles, consumer electronic devices, and industrial machinery, to name several examples. Such devices may be configured with suitable electronics and logic for establishing a communications link with the mobile electronic device, e.g. via a wireless connection (e.g., Wi-Fi™, Bluetooth™, or the like) or possibly via a wired connection formed by abutting electrical contacts of complementary, aligned magnetic connectors.

In one example embodiment, the other electronic device is a piece of sporting equipment, namely a skateboard. This is depicted in bottom plan view in FIG. 15.

Figure 15:
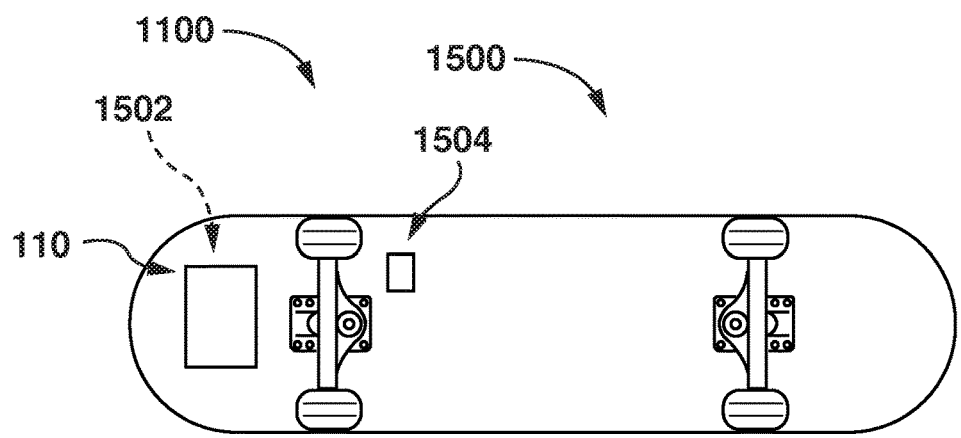
FIG. 15 is bottom plan view of an alternative embodiment of hybrid electronic device formed using the mobile electronic device of FIG. 1 and a skateboard.

Referring to FIG. 15, a skateboard 1500 has a mounting area 1502 defined on its underside. The mounting area may be similar to wall mount 220 discussed above (see e.g. FIG. 5), incorporating a plurality of magnetic connectors that align with the magnetic connectors of mobile electronic device 110. The mobile electronic device 110 may be magnetically attachable to the skateboard 1500 at mounting area 1502, possibly with the front face of the device abutting the underside of the skateboard to protect the touchscreen of the device 110.

The skateboard 1500 has one or more hardware resources 1504 that may be accessed by the mobile electronic device 110. These may for example be sensors for collecting data (e.g. an accelerometer, a GPS receiver, or a speedometer) or actuators (e.g. a motor for propelling the skateboard or a solenoid for engaging a brake). Other pieces of equipment that could be similarly configured include surfboards, skis, snowboards, snowmobiles, and go-karts.

In another embodiment, the other electronic device is an appliance, namely a laundry washing machine. This is depicted in perspective view in FIG. 16.

Figure 16:
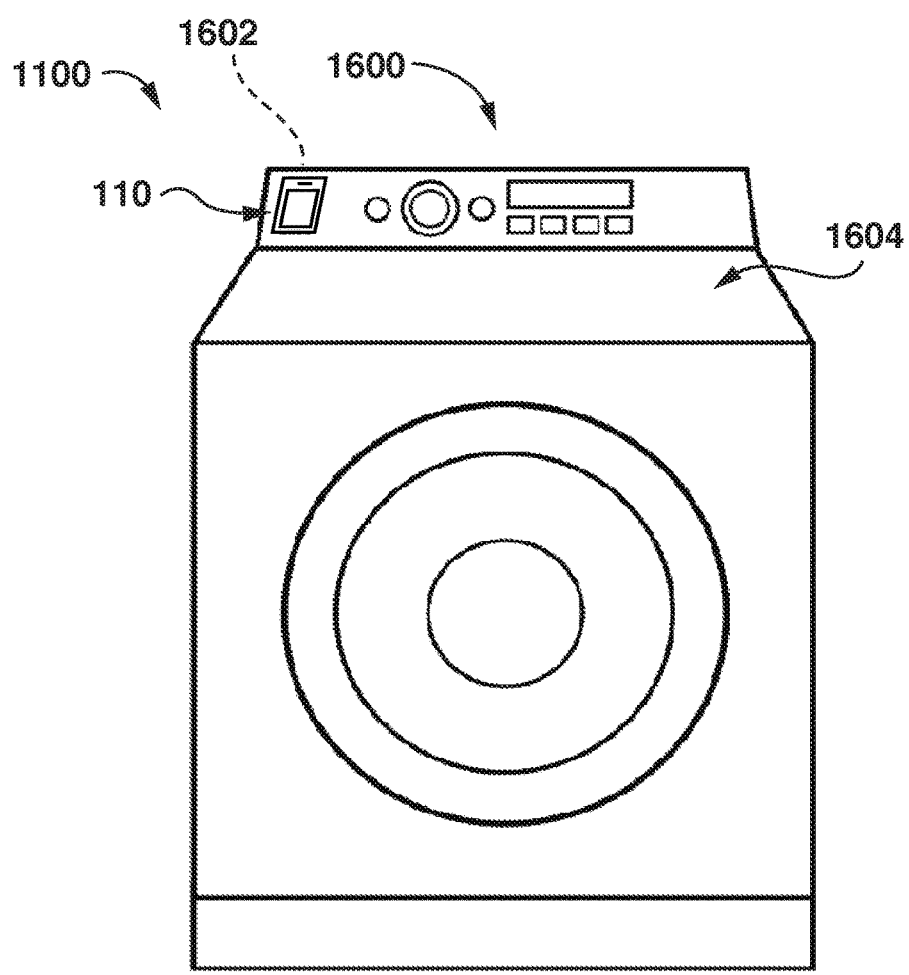
FIG. 16 is a perspective view of a further alternative embodiment of hybrid electronic device formed using the mobile electronic device of FIG. 1 and a laundry washing machine.

Referring to FIG. 16, a laundry washing machine 1600 has a mounting area 1602 defined on its control panel. The mounting area may be similar to mounting area 1502 of FIG. 15. The mobile electronic device 110 is magnetically attachable to the appliance 1600 at mounting area 1602, possibly with the front face of the device facing outwardly with the touchscreen of the device 110 being visible. The appliance 1600 has one or more hardware resources 1604 that may be accessed by the mobile electronic device 110. These may for example be sensors for collecting data (e.g. temperature sensors, water flow sensors, load sensors) or actuators (e.g. a motor or a pump). Other appliances that could be similarly configured include dishwashers or laundry dryers.

In a further embodiment, the other electronic device is vehicle. This is depicted in perspective view in FIG. 17.

Figure 17:
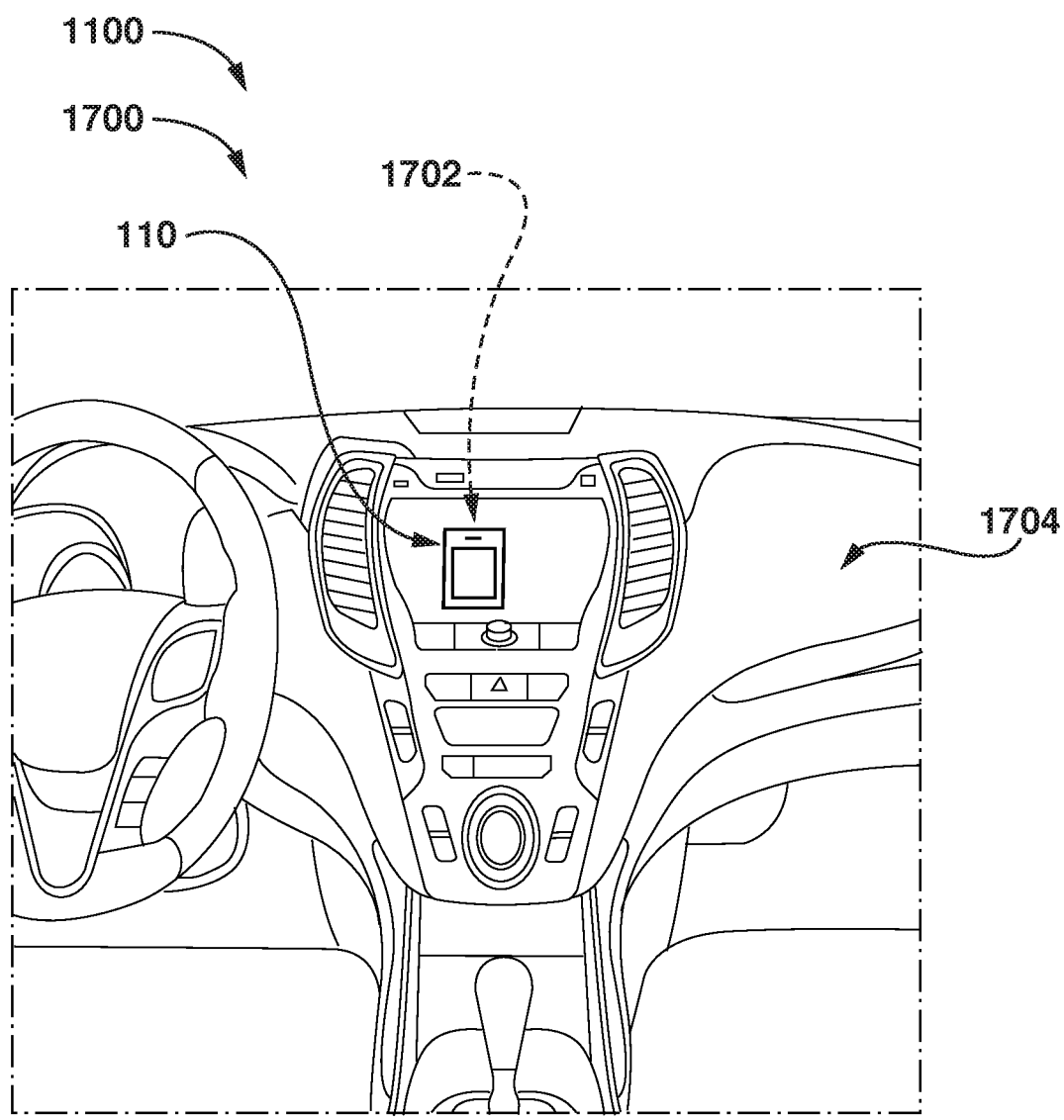
FIG. 17 is a perspective view of a further alternative embodiment of hybrid electronic device formed using the mobile electronic device of FIG. 1 and vehicle.

Referring to FIG. 17, a vehicle 1700 has a mounting area 1702 defined on its dashboard. The mounting area may be similar to mounting area 1602 of FIG. 16. The mobile electronic device 110 is magnetically attachable to the vehicle 1700 at mounting area 1702, possibly with the front face of the device facing outwardly with the touchscreen of the device 110 being visible. The vehicle 1700 has one or more hardware resources 1704 that may be accessed by the mobile electronic device 110. These may for example be sensors for collecting data (e.g. temperature sensors, odometer readings, engine condition monitoring sensors) or actuators (e.g. the starter or accessories such as a power mirrors, radio, speakers).

Example operation of each these various alternative embodiments, and example alternative operation of the originally described embodiment of FIG. 5, is described below with reference to FIG. 6.

A user may magnetically attach the mobile electronic device 110 to another electronic device 200, 1500, 1600 or 1700 using magnetic connectors 132, 134, 136 and 138.

When the magnetic attachment is made, a connection event is detected at each of the at least one magnetic connector used for the magnetic attachment (operation 602, FIG. 6).

In response to the detecting, mobile electronic device 110 may establish a wireless communication link with the device 200, 1500, 1600 or 1700 (operation 604, FIG. 6). This may entail enabling a wireless interface for communication with device 200, 1500, 1600 or 1700. Similarly, detection at device 200, 1500, 1600 or 1700 of the magnetic attachment may cause that device 200 to enable a wireless interface for communication with mobile electronic device 110. Establishment of the wireless communications link may entail handshaking between mobile electronic device 110 and device 200, 1500, 1600 or 1700.

Optionally, mobile electronic device 110 may transmit a request to an access control server 300 (e.g. as shown in FIG. 10) for access to device 200, 1500, 1600 or 1700, or portions (e.g., components/features) thereof. Server 300 may process that request based on the access rights granted to a particular user profile, as stored in the database 304 that is connected to or hosted at server 300.

The database 304 may store records reflective of devices (e.g., mobile electronic device 110, other similar mobile electronic devices, and devices 200, 1500, 1600 or 1700 to which the mobile electronic devices are magnetically attachable) associated with particular users or user profiles. A user may have multiple profiles, suitable for different operating scenarios (e.g., home/personal, work, private/incognito).

The records may store data reflective of access rights to particular devices. For example, rights may include rights to connect to particular devices, rights to access particular hardware resources (e.g. read from particular sensors, activate particular actuators) at particular devices. Rights may be circumscribed in time, e.g., with defined start times and stop times.

Figure 18:
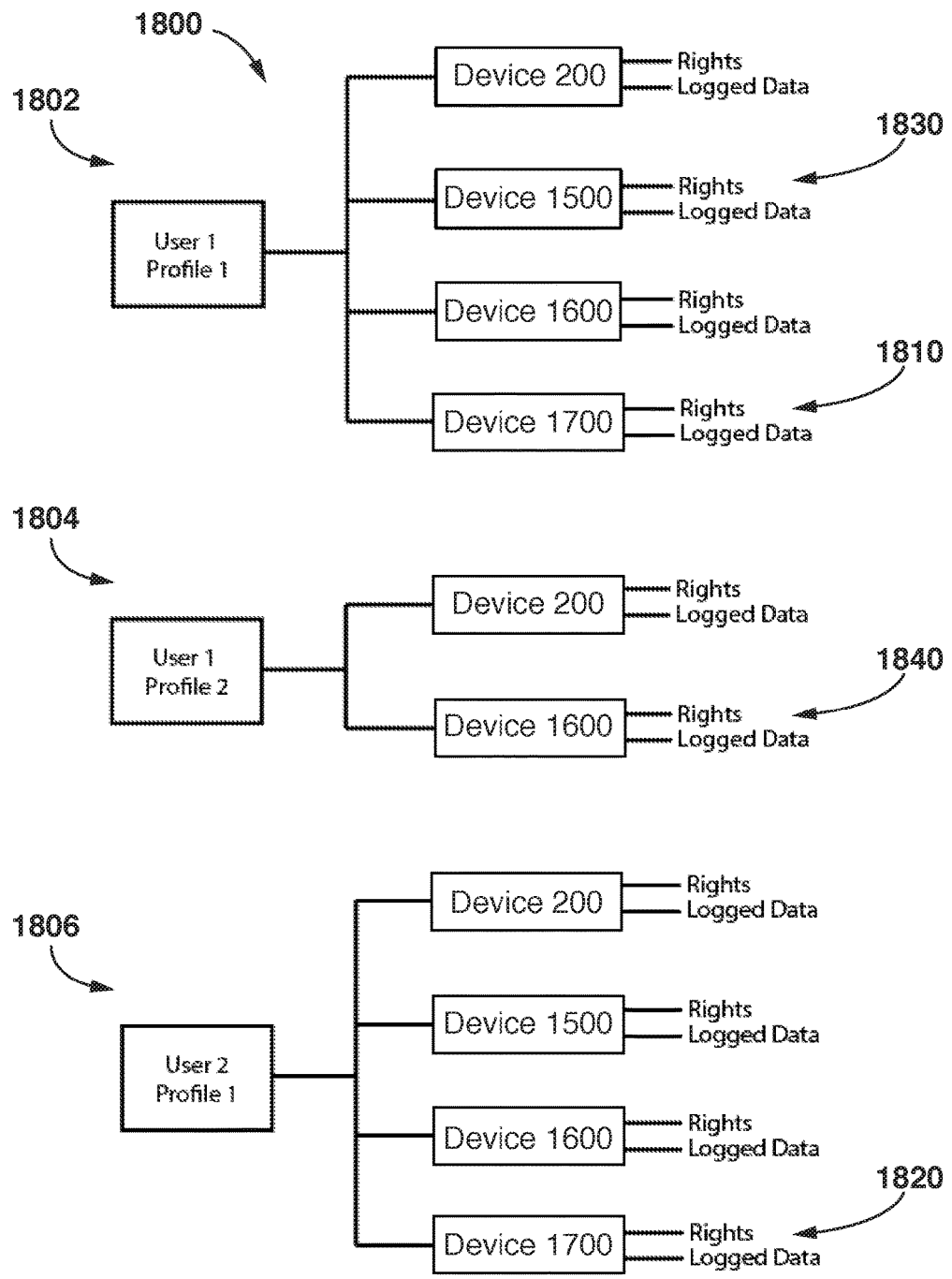
FIG. 18 is a schematic view of a data structure for storing access rights and logged data for a number of electronic devices in association with various user profiles.

FIG. 18 shows an example data structure 1800 (e.g. a set of tables in a relational database, such as database 304) for several user profiles 1802, 1804 and 1806. Each user profile 1802, 1804, and 1806 stores records associated with one or more electronic devices, such as electronic devices 200, 1500, 1600 and 1700, with which a mobile electronic device (such as mobile electronic device 110) of the relevant user may be magnetically attached. For each such electronic device, the data structure 1800 of the illustrated embodiment stores: (a) access rights information, i.e. which hardware resources (e.g. sensor, actuators) of the relevant electronic device 200, 1500, 1600 and 1700 can be accessed by that user under that profile; and (b) logged data representing data from the relevant electronic device 200, 1500, 1600 and 1700 that has been logged in association with previous magnetic attachments of a mobile electronic device 110 of the relevant user, under that profile, with the relevant electronic device 200, 1500, 1600 or 1700.

As can be seen, the same user may have different profiles, and the rights to use particular devices may be profile-specific. For example, profile 1 (1802, FIG. 18) allows a user "user 1" to access hardware resources of each of devices 200, 1500, 1600 and 1700. In contrast, profile 2 (1804, FIG. 18) only allows that same user to access hardware resources of devices 200 and 1600 (the absence of records for devices 1500 and 1700 being indicative of an absence of any access rights to those devices, for that user profile, in the present embodiment).

As can be seen, multiple users may be associated with the same device. For example, as show in FIG. 18, device 200 is accessible by each of users 1, 2 and 3. Access rights to the device could be time-divided amongst multiple users.

Access rights to hardware resources of a particular device may differ between user profiles and between users. For example, access rights 1810 of a first user (who may be a vehicle owner) for accessing hardware resources of device 1700 of FIG. 17 (the vehicle) may permit the owner to read from all vehicle sensors (e.g. speedometer, odometer, engine sensors) and to control all vehicle actuators (e.g. the starter, the door locks, the accessories). In contrast, access rights 1820 of a second user (e.g. a family member) may permit limited access to only a predetermined subset of the hardware resources of the vehicle (e.g. the door locks).

In another example, if the other electronic device is a skateboard 1500 (FIG. 15), database 304 may store records 1830 reflecting the right of a particular user (user 1) under a particular user profile (profile 1) to read from an accelerometer embedded in the skateboard 1500. In a further example, if the device is a washing machine 1600 (FIG. 16), database 304 may store records 1840 reflecting the right of a particular user (user 1) under a particular user profile (profile 2) to operate the machine 1600 (e.g., start a wash cycle). In yet another example, if the device is a vehicle 1700 (FIG. 17). database 304 may store records 1810 reflecting the right of a particular user (user 1) under a particular user profile (profile 1) to start the engine, to activate the car radio, to read from engine sensors, etc.

Rights may be granted to a user, upon request from that user. For example, the right to connect to a device 200, 1500, 1600 or 1700 may be requested by a user prior to or upon connection to a device 200, 1500, 1600 or 1700. Rights may be granted to a user upon payment of a fee (e.g., a device rental fee).

Rights may also be granted upon request to server 300 by another user, e.g., the owner of a device may grant rights for that device to other users.

In these manners, devices, portions thereof, and hardware utility may be shared amongst multiple users.

Referring back to FIG. 6, following handshaking, a session is instantiated at device 110 for data communication with device 1500, 1600 or 1700 (operation 604, FIG. 6). For clarity, the term "session" as used herein refers to a secured communication link. A "session" key may be used for encryption, which expires after use. Forming a session is optional.

The session may be instantiated using a token or other code, such as a symmetric encryption key, received from server 300 for gaining access to device 200, 1500, 1600, or 1700 or portions thereof. The session may be instantiated in association with a particular user, and/or a particular user profile. The session may be instantiated upon verifying the identity of the user, e.g., using suitable sensors such as a fingerprint sensor at the mobile electronic device 110 or the other electronic device 200, 1500, 1600 or 1700, or using a password or other code supplied by the user. Verification may be performed by mobile electronic device 110, device 200, 1500, 1600, or 1700, server 300, or some/all in cooperation.

Instantiation of a session at mobile electronic device 110 may include creating a data structure (e.g. within app 196) reflecting states of the devices and user data. State/user data may be carried from a previous session, as may be stored at device 110 or server 300.

In the present embodiment, data is communicated wirelessly. In alternative embodiments, data may be communicated through a wired connection established through electrical contacts on the magnetic connectors.

Optionally, mobile electronic device 110 may obtain an identifier of device 200, 1500, 1600, or 1700, its type (e.g., whether it is a washing machine, a vehicle, a skateboard), and/or an enumeration of its features (e.g., available sensors, actuators, input/output interfaces).

Optionally, mobile electronic device 110 may download software (e.g., drivers) from server 300 to interface with device 200, 1500, 1600, or 1700 (e.g., for accessing sensors or controlling actuators) or for processing data logged from sensors.

Optionally, the mobile electronic device 110 may download software (e.g., firmware) from server 300 to update software that executes at device 200, 1500, 1600, or 1700.

In a subsequent operation, the mobile electronic device 110 sends, to access control server 300, a request for access to the hardware resource of the other electronic device 200, 1500, 1600 or 1700 (operation 606, FIG. 6). It is presumed that the server 300 responds with a positive response to the mobile electronic device 110 containing a token indicative of the hardware resource(s) to which access has been granted. The token can be sent to the electronic device 200, 1500, 1600 or 1700 via the communications link to open up access to the hardware resources of interest. In some embodiments, the sending of the access request and the receipt of the positive response may occur before the mutual magnetic attachment of the devices, e.g. based on a broadcast device ID of device 200, 1500, 1600 or 1700 received at the mobile electronic device 110 before magnetic attachment with the device 200, 1500, 1600 or 1700.

Finally, the mobile electronic device 110 accesses the hardware resources of device 200, 1500, 1600, or 1700 (operation 608, FIG. 6). The hardware resources could be input resources, output resources, or both. As noted, the amalgam of mobile electronic device 110 and device 200, 1500, 1600, or 1700 may be referred to as hybrid or amalgamated device 1100.

During this session, as amalgamated device 1100 is being operated by the user, mobile electronic device 110 may log data captured by one or more of sensors of device 1100 (e.g., sensors at mobile electronic device 110 or device 200, 1500, 1600 or 1700).

Of note, mobile electronic device 110 may log data from its own sensors and from sensors of the other electronic device 200, 1500, 1600, or 1700, in combination.

Optionally, a power link may be established between mobile electronic device 110 and device 200, 1500, 1600, or 1700. Direction of power transfer across this link may be controlled by mobile electronic device 110.

Use of distinct hardware resources in each substituent device of the hybrid electronic device may provide benefits that would be difficult or impossible to obtain through use of each device independently of the other. For instance, in the skateboard example depicted in FIG. 15, mobile electronic device 110 may include a sensor that is a GPS sensor or receiver and the electronic device 1500 to which it has been magnetically attached (i.e. the skateboard) may include sensors 1504 that are an accelerometer and gyroscope, respectively. As a user operates the skateboard 1500, the magnetically attached mobile electronic device 110 may read from this GPS sensor of one device 110 and the accelerometer and the gyroscope of the other device 1500. Sensor data may be stored at mobile electronic device 110, and/or transmitted to server 300.

Such data may be stored by server 300 in database 304 for later processing using various analytics techniques. For example, GPS sensor data may be analyzed to determine route/speed information. The accelerometer/gyroscope data may be analyzed to identify actions (e.g., "tricks") performed by the user on the skateboard. Some or all of the analysis may also be performed at mobile electronic device 110. Sensor data and/or analysis results for multiple user profiles may be compared (e.g., to compare skill levels), or aggregated at server 300 to determine population trends/statistics.

In another example, referring to FIG. 16, mobile electronic device 110 may log data temperature/water level data from the other electronic device (a washing machine) to which it has been magnetically attached. Mobile electronic device 110 may log such data. Such data may be analyzed at mobile electronic device 110 or server 202 to determine, e.g., when to add detergent or fabric softener. Electronic notifications may be automatically sent to a user associated with the session, based on such analysis. Data over multiple wash cycles may be analyzed to monitor water consumption over a period of time.

In yet another example, referring to FIG. 17, mobile electronic device 110 may be magnetically attached to a vehicle 1700 that has a plurality of sensors (e.g., engine sensors, fuel level sensors, odometer, speedometer, etc). Mobile electronic device 110 may log data from such sensors. Such data may be analyzed, for example, to analyze engine performance and to suggest maintenance operations to the user. Notifications of suggested maintenance may be sent to mobile electronic device 110. Such data may be analyzed to determine duration of use, fuel consumed, etc., by a particular user, e.g., so that the user may be charged for such use. Mobile electronic device 110 may also provide an interface (e.g., a touch and/or display interface) allowing users to control various components of the vehicle 1700 (e.g., start the engine, tune the radio, adjust the mirrors, etc.).

In any of the above-described embodiments, a user may detach mobile electronic device 110 from the other electronic device 200, 1500, 1600 or 1700. Upon detecting the disconnection of the electrical connection, mobile electronic device 110 may terminate the session and the associated communications link between devices. State/user data for the session may be stored at mobile electronic device 110 or at server 300.

Various alternative embodiments are possible.

In at least some of the above embodiments, electronic devices are described as being mutually magnetically attached to one another using multiple magnetic connectors. The use of multiple magnetic connectors may provide satisfactory mechanical stability and/or, in the case of wired connectors, may improve data throughput of the connection. Nevertheless, it is possible for two devices to be mutually magnetically attached using just one magnetic connector in each device. This may be suitable, e.g., in cases where the mobile electronic device is very small or lightweight and is unlikely to be disconnected during normal use (e.g. due to inertia).

At least some of the embodiments described above incorporate transceivers that are antennas. In a specific embodiment, the antennas may be an extremely high frequency (EHF) transmitter/receivers as provided by Keyssa (keyssa.com).

In alternative embodiments, the transceiver may be a form of wireless communication element that is not an antenna per se. For example, in one embodiment, the wireless elements may be optical signaling elements (e.g. infrared light transmitters or receivers).

In another embodiment, the transceiver may be a longitudinal electric induction coupler, as described for example in "TransferJet—Concept and Technology Rev. 1.5" issued by the Transfer Jet Consortium, the contents of which are incorporated herein by reference. Ultra short range wireless communication may occur between such transceivers in accordance with the protocol defined in the above-referenced document. The wireless communication may be considered to conform to the TransferJet™ protocol or a version thereof. Conveniently, the use of electric field induction may improve the data transmission rate, e.g., to over 500 Mbit/s or higher.

In some embodiments, the transceiver 144 may be intended for use in a wired connection between the device 110 and another device. In such cases, the transceiver may be a hardware component that applies outgoing signals onto one or more physical wires and detects incoming signals on the wire(s). Such transceivers may for example be used in device embodiments incorporating a magnetic connector with electrical contacts that mate with corresponding electrical contacts of a mating magnetic connector, wherein data is transmitted between devices via the mated contacts.

Any of the magnets contemplated herein may be electromagnets.

In at least some of the above embodiments, magnetic connectors incorporate movable magnets whose movement or position can be sensed to ascertain a connectedness state of the magnetic connectors. In some embodiments, the magnetic connectors may not incorporate any moving magnets. Rather, the magnets may be fixed in relation to a surface of the device in which they are disposed. In such embodiments, different sensor arrangements than those described above may be used. For example, force sensor could be placed between a magnet of one device and a magnet of another device (e.g., in a cavity housing a magnet). Attraction will create a force, even when the magnet comprising each connector does not move. Alternatively, connection of magnets may complete an electrical path, causing a change in voltage or capacitance, which may be measured.

When the mobile electronic device 110 or device 200, 1500, 1600 or 1700 incorporates hardware resources that are sensors, the sensors may be any type of conventional sensor, e.g., pressure sensor, temperature sensor, humidity sensor, accelerometer, magnetometer, compass, audio sensor, light sensor, camera sensor, motion sensor, touch sensor, fingerprint sensor, heart rate sensor, etc.

In some embodiments in which the magnetic connectors are configured to transmit data signals through electrical conductivity, in addition to, or instead of a wireless communications link, mobile electronic device 110 and device 200, 1500, 1600 or 1700 may form a communications link through an electrical connection established through the magnetic connectors.

Regardless of whether communications links are established wirelessly or through magnetic connectors (or both), the communications link(s) allow(s) mobile electronic device 110 to read from one or more input resources at the other electronic device 200, 1500, 1600 or 1700. Similarly, the communications link(s) allow(s) mobile electronic device 110 control one or more output resources at device 200, 1500, 1600 or 1700. Communications links may be protected from intrusion by software encryption, hardware shielding, etc.

In some embodiments, mobile electronic device 110 and device 200, 1500, 1600 or 1700 may form a power link through an electrical connection established through the magnetic connectors (if any). In this way mobile electronic device 110 may draw power from device 200, 1500, 1600 or 1700, or vice versa.

In some embodiments, a hybrid electronic device may be formed by magnetically attaching a mobile electronic device with multiple other electronic devices by way of magnetic connectors. This is depicted schematically in FIG. 19.

Figure 19:
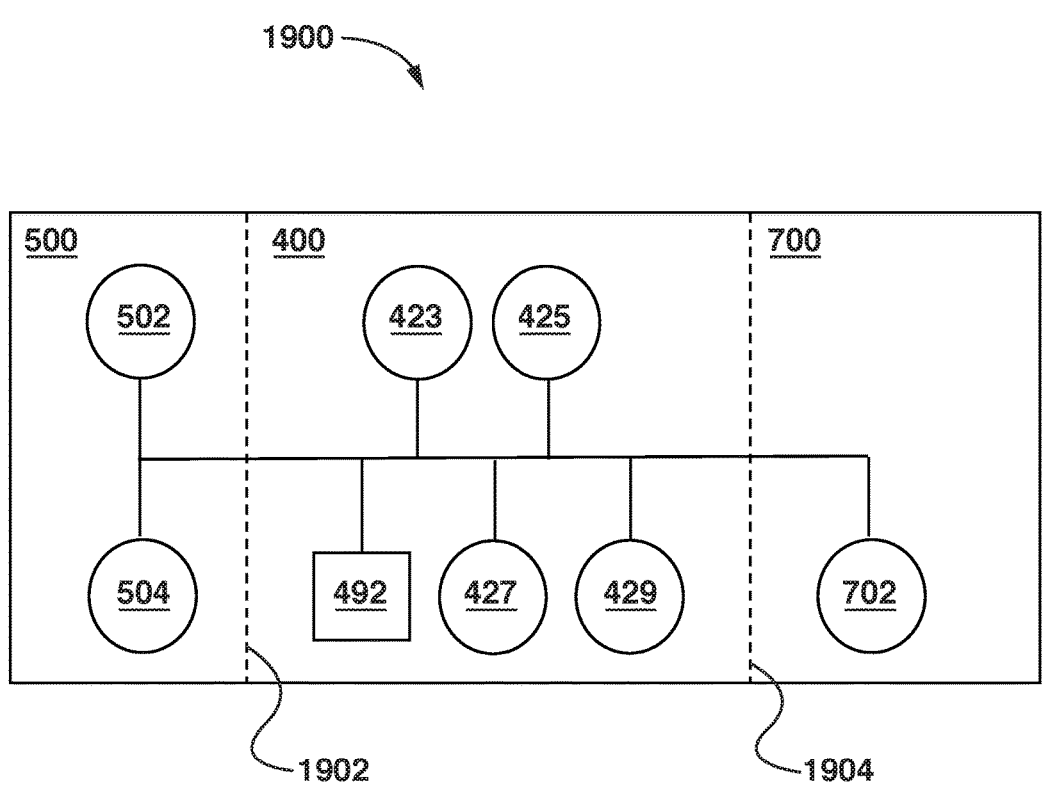
FIG. 19 is a schematic view of an alternative embodiment of hybrid electronic device formed using the mobile electronic device of FIG. 1 and two other electronic devices.

Referring to FIG. 19, a mobile electronic device 400 is magnetically attached to each of two separate devices 500 and 700, using magnetic connectors, to form a hybrid electronic device 1900. The mobile electronic device 400 may be similar to mobile electronic device 110 described above, e.g. having hardware resources 423, 425, 427 and 429 analogous to hardware resources 123, 125, 127 and 129, respectively, controlled by a processor 492, which may be similar to processor 192. The connections 1902, 1904 between mobile electronic device 400 and each of devices 500, 700 is mechanical, providing stable magnetic attachment of the devices, and electrical, allowing data and/or power transfer between the devices.

Each device 500, 700 contains at least one hardware resource 502, 504 and 702. Device 500 may for example be configured to function as a dedicated sensor module, having sensors 502, 504 and 702, for interconnection and interoperation with a mobile electronic device. Device 700 may be another device having an additional sensor 702. In this way, mobile electronic device may be augmented with additional sensors from two separate electronic devices simultaneously. Communication links between mobile electronic device 400 and one or more hardware resources 502, 504 and 702 may be established, allowing device 400 to read from those hardware resources.

During operation, device 400 may log sensor data from one or more sensors 502, 504 or 702. Logged sensor data may be stored and/or processed at mobile electronic device 400. Logged sensor data may also be transmitted by device 400 for storage and/or processing at a remote server (e.g., a cloud-based server).

One or more of mobile electronic device 400, device 500, and device 700 may include a power source (e.g., a battery). However, as will be appreciated, in embodiments in which the magnetic connectors are configured to transmit power, the hybrid electronic device 1900 may require only one power source. So, in one example, each of device 500 and device 700 may draw power from mobile electronic device 400, and sensors 502, 504 and 702 may be powered by a power source at device 400. Conversely, device 400 may draw power from one or both of device 500 and device 700, and processor 492/hardware resources 423, 425, 427 and 429 may be powered by a power source at device 500 or device 700. Direction of power flow within an amalgamated device 1900 may be controlled by device 400, e.g., based on user input, pre-defined rules, amount of power available at each power source, etc.

In at least some of the embodiments described above, the mobile electronic device 110 sends a request for access to the remote server 300 in response to magnetic attachment of mobile electronic device 110 with another electronic device 200, 1500, 1600 or 1700. It will be appreciated that the mobile electronic device 110 could send such an access request prior to the magnetic attachment of the mobile electronic device 110 to the other electronic device 200, 1500, 1600 or 1700. For example, the mobile electronic device 110 could receive a device ID of device 200, 1500, 1600 or 1700 via Bluetooth™ broadcast when it is within Bluetooth™ range but not yet magnetically attached. This may trigger the sending of the access request to server 300 as earlier described, with any positive response being stored locally at the mobile electronic device 110 for possible future reference. The mobile electronic device 110 may then be magnetically attached to device 200, 1500, 1600 or 1700 and a communications link established between the two (possibly using credentials from the positive response from the remote server), and the hardware resource(s) may then be accessed based on the earlier received positive response from the server 300.

Other modifications may be made within the scope of the following claims.

What is claimed is:

1. A method at a mobile electronic device having at least one magnetic connector, the method comprising:
   upon magnetic attachment of the mobile electronic device to an other electronic device using the at least one magnetic connector, detecting a connection event at each of the at least one magnetic connector used for the magnetic attachment;
   in response to the detecting, automatically establishing a communications link between the mobile electronic device and the other electronic device;
   sending, from the mobile electronic device to a remote server, a request for access to a hardware resource of the other electronic device; and
   based on a positive response from the remote server, accessing, from the magnetically attached mobile electronic device, via the communications link, the hardware resource of the other electronic device,
   wherein the sending, from the mobile electronic device to the remote server, of the request for access to the hardware resource of the other electronic device occurs prior to the magnetic attachment of the mobile electronic device to the other electronic device.

2. The method of claim 1 wherein the request for access comprises a unique ID of a hardware resource of the other electronic device to which access is sought.

3. The method of claim 1 wherein the request for access comprises a unique ID of the other electronic device containing the hardware resource to which access is sought.

4. The method of claim 1 wherein the request for access further comprises a user ID, or user profile ID, of a user associated with the mobile electronic device.

5. The method of claim 1 further comprising receiving a positive response from the remote server and, based on the positive response, storing at the mobile electronic device an indication of the hardware resource to which access is granted.

6. A mobile electronic device comprising:
   a transceiver;
   at least one magnetic connector;
   connectedness detection circuitry operable to dynamically detect a connection event at each of the at least one magnetic connector;
   a processor, coupled to the connectedness detection circuitry, operable to:
   automatically establish a communications link, via the transceiver, with an other electronic device upon detection, by the connectedness detection circuitry, of the connection event at a predetermined set of the at least one magnetic connector;
   send, from the mobile electronic device to a remote server, a request for access to a hardware resource of the other electronic device; and
   based on a positive response from the remote server, access, via the wireless communications link, a hardware resource of the other electronic device,
   wherein the sending, from the mobile electronic device to the remote server, of the request for access to the hardware resource of the other electronic device occurs prior to the detection of the connection event at the predetermined set of the at least one magnetic connector.

7. The mobile electronic device of claim 6 wherein the at least one magnetic connector comprises a plurality of magnetic connectors.

8. The mobile electronic device of claim 7 wherein the predetermined set of the magnetic connectors comprises a subset of the plurality of magnetic connectors.

9. The mobile electronic device of claim 7 wherein the predetermined set of the magnetic connectors comprises all of the magnetic connectors of the plurality.

10. A cloud server comprising:
    a network interface controller; and
    a processor operable to:
    receive, via the network interface controller, a request, from a mobile electronic device having at least one magnetic connector, for access to a hardware resource of an other electronic device, the other electronic device having at least one complementary magnetic connector selectively attachable to the magnetic connector of the mobile electronic device for mutual magnetic attachment of the devices, the request containing a unique ID associated with the other electronic device, the request being sent from the mobile electronic device prior to the mutual magnetic attachment of the devices;
    based at least upon on the unique ID in the request, determining access rights to the hardware resource for the mobile electronic device; and
    based on the determined access rights to the hardware resource, sending to the mobile electronic device, via the network interface controller, one of a positive response indicating that access to the hardware resource is granted and a negative response indicating that access to the hardware resource is denied.

11. The cloud server of claim 10 wherein the request from the mobile electronic device contains a user profile ID and wherein the access rights are specific to a user profile associated with the user profile ID.

12. The cloud server of claim 10 wherein the request from the mobile electronic device contains a user ID and wherein the access rights are specific to a user associated with the user ID.

13. The cloud server of claim 10 wherein the request from the mobile electronic device contains a device ID of the mobile electronic device and wherein the access rights are specific to the mobile electronic device.

14. The cloud server of claim 10 wherein the access rights to the hardware resource specify a time limit for the mobile electronic device to access the hardware resource of the other electronic device.

15. The cloud server of claim 14 wherein the time limit for the mobile electronic device to access the hardware resource of the other electronic device is user-specific or user profile-specific.

16. The cloud server of claim 14 wherein the unique ID in the request is a device ID of the other electronic device.

17. The cloud server of claim 14 wherein the unique ID in the request is an ID of the hardware resource to which access is sought.

* * * * *